United States Patent
Matsuno et al.

(10) Patent No.: US 10,109,884 B2
(45) Date of Patent: Oct. 23, 2018

(54) NON-AQUEOUS ELECTROLYTE SECONDARY BATTERY

(71) Applicant: Nissan Motor Co., Ltd., Yokohama-Shi, Kanagawa (JP)

(72) Inventors: Tomohisa Matsuno, Kanagawa (JP); Hirofumi Yasuda, Kanagawa (JP); Naoko Nishimura, Kanagawa (JP); Kazuyuki Sakamoto, Kanagawa (JP); Yosuke Suzuki, Kanagawa (JP); Shinnichi Tasaki, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/129,361

(22) PCT Filed: Mar. 20, 2015

(86) PCT No.: PCT/JP2015/058602
§ 371 (c)(1),
(2) Date: Sep. 26, 2016

(87) PCT Pub. No.: WO2015/146857
PCT Pub. Date: Oct. 1, 2015

(65) Prior Publication Data
US 2017/0117583 A1 Apr. 27, 2017

(30) Foreign Application Priority Data
Mar. 27, 2014 (JP) .................................. 2014-067224

(51) Int. Cl.
*H01M 10/0567* (2010.01)
*H01M 4/505* (2010.01)
(Continued)

(52) U.S. Cl.
CPC ....... *H01M 10/0567* (2013.01); *H01M 4/133* (2013.01); *H01M 4/505* (2013.01);
(Continued)

(58) Field of Classification Search
CPC ......... H01M 10/0567; H01M 10/0565; H01M 10/0525; H01M 4/505; H01M 4/525; H01M 4/587; H01M 4/133; H01M 2300/0085
See application file for complete search history.

(56) References Cited

U.S. PATENT DOCUMENTS 6,797,434 B1  9/2004  Matsubara et al.
2004/0115117 A1  6/2004  Takei et al.
(Continued)

FOREIGN PATENT DOCUMENTS

EP   2109177 A1   10/2009
EP   2418172 A1   2/2012
(Continued)

OTHER PUBLICATIONS

Whittingham, M. Stanley, "Lithium Batteries and Cathode Materials", Chemical Reviews, vol. 104, No. 10, Oct. 1, 2004, pp. 4271-4302.

*Primary Examiner* — Laura Weiner
(74) *Attorney, Agent, or Firm* — Young Basile Hanlon & MacFarlane, P.C.

(57) ABSTRACT

A non-aqueous electrolyte secondary battery is capable of suppressing a local reaction of a negative electrode active material due to the electrolyte during charging and discharging and improving a capacity retention ratio of a using a carbon material such as artificial graphite particles for the negative electrode active material. The non-aqueous electrolyte secondary battery includes a negative electrode containing a carbon-based negative electrode active material, an
(Continued)

electrolyte layer, and a positive electrode containing a positive electrode active material, and having a tap density of the negative electrode active material of 0.96 g/cc or more.

1 Claim, 4 Drawing Sheets

(51) Int. Cl.
H01M 4/525 (2010.01)
H01M 4/587 (2010.01)
H01M 10/0565 (2010.01)
H01M 10/0525 (2010.01)
H01M 4/133 (2010.01)

(52) U.S. Cl.
CPC .......... *H01M 4/525* (2013.01); *H01M 4/587* (2013.01); *H01M 10/0525* (2013.01); *H01M 10/0565* (2013.01); *H01M 2220/20* (2013.01); *H01M 2300/0085* (2013.01); *Y02T 10/7011* (2013.01)

(56) References Cited

U.S. PATENT DOCUMENTS

| | | | |
|---|---|---|---|
| 2010/0015514 A1* | 1/2010 | Miyagi | H01M 4/131 |
| | | | 429/129 |
| 2012/0121988 A1 | 5/2012 | Lee et al. | |
| 2013/0330620 A1 | 12/2013 | Nishimura et al. | |
| 2014/0134492 A1 | 5/2014 | Yamami et al. | |
| 2014/0199601 A1* | 7/2014 | Onozuka | H01M 10/0567 |
| | | | 429/338 |
| 2015/0155597 A1 | 6/2015 | Ishikawa et al. | |
| 2016/0028123 A1* | 1/2016 | Kawasaki | H01M 10/0567 |
| | | | 429/336 |

FOREIGN PATENT DOCUMENTS

| | | |
|---|---|---|
| JP | 2001102048 A | 4/2001 |
| JP | 2001148241 A | 5/2001 |
| JP | 2008112722 A | 5/2008 |
| JP | 5081335 B1 | 11/2012 |
| WO | 2002059040 A1 | 8/2002 |
| WO | 2011/010789 A2 | 1/2011 |
| WO | 2013002162 A1 | 1/2013 |
| WO | 2014/003077 A1 | 1/2014 |

* cited by examiner

SMALL GAP

LARGE GAP

NON-AQUEOUS ELECTROLYTE SECONDARY BATTERY

CROSS REFERENCE TO RELATED APPLICATION

The entire contents of the Japanese Patent Application No. 2014-067224, filed on Mar. 27, 2014, in which the priority right of the present application is claimed, is herein incorporated by reference.

TECHNICAL FIELD

The present invention relates to a non-aqueous electrolyte secondary battery.

BACKGROUND

Currently, a non-aqueous electrolyte secondary battery including a lithium ion secondary battery, which is used for a mobile device such as a mobile phone, is available as a commercial product. In general, the non-aqueous electrolyte secondary battery has a constitution in which a positive electrode and a negative electrode are connected to each other through an electrolyte layer; in the positive electrode, a current collector is coated with a positive electrode active material or the like, in the negative electrode, a current collector is coated with a negative electrode active material or the like, and in the electrolyte layer, a non-aqueous electrolytic solution or a non-aqueous electrolyte gel is held within a separator. According to occlusion and release of ions such as lithium ions in and from the electrode active material, a charge-discharge reaction of a battery occurs.

In recent years, it is desired to reduce an amount of carbon dioxide in order to cope with the global warming. A non-aqueous electrolyte secondary battery having a small environmental burden has been used not only for a mobile device or the like but also for a power supply device of an electric vehicle such as a hybrid vehicle (HEV), an electric vehicle (EV), and a fuel cell vehicle.

The non-aqueous electrolyte secondary battery for application to an electric vehicle is required to have a high output and a high capacity. As a negative electrode active material used for a negative electrode of a non-aqueous electrolyte secondary battery for an electric vehicle, a material having a high output and a high capacity is required from a viewpoint of a capacity and an output characteristic.

For example, WO 2002/059040 A describes an artificial graphite particle having a secondary particle structure in which a plurality of primary particles are assembled or bonded to each other, and the plurality of primary particles each having a layer structure in which an edge portion of each of the primary particles is bent into a polygonal shape are assembled or bonded to each other.

However, the invention described in WO 2002/059040 A does not specify the shape of the artificial graphite particle (primary particle and secondary particle structure) which is a negative electrode active material. Actually, the shape of the artificial graphite particle (primary particle and secondary particle structure) in WO 2002/059040 A is a nonuniform shape having many protrusions (irregular shape). Meanwhile, a coating film is formed on a particle surface of the negative electrode active material during charging and discharging. The shape of the negative electrode active material has an influence on formation of the coating on the particle surface of the negative electrode active material. Uniformity of the coating is involved in uniformity of a chemical reaction in the particle surface of the negative electrode active material. The low uniformity locally deteriorates the negative electrode active material during charging and discharging to reduce a charge-discharge capacity. Therefore, in the nonuniform shape having many protrusions (irregular shape) as in WO 2002/059040 A, the uniformity of the coating is low. Therefore, the negative electrode active material is locally deteriorated during charging and discharging to reduce the charge-discharge capacity. That is, in the nonuniform shape having many protrusions, uniformity of the coating is extremely low in the protrusions and therearound, and a region in which the coating is not formed tends to be present in the protrusions and therearound. In addition, the surface area of the protrusions (reaction area or contact area) is very large, and a reaction with an electrolyte is locally promoted rapidly during charging and discharging. At this time, the local reaction with an electrolyte proceeds significantly in the protrusions in the region in which the coating is not formed and therearound. As a result, in the protrusions, local deterioration of the active material (for example, inactivated due to a distortion, collapse, or the like of a crystal structure) proceeds rapidly due to repeated charging and discharging, and the capacity retention ratio of the secondary battery is reduced disadvantageously.

SUMMARY

Therefore, an object of the present invention is to provide a means capable of suppressing a local reaction of a negative electrode active material due to an electrolyte during charging and discharging and improving a capacity retention ratio of a battery in a non-aqueous electrolyte secondary battery using a carbon material such as artificial graphite particles for the negative electrode active material.

The present inventors made intensive studies. As a result, the present inventors have found that the above problem is solved by the tap density of a negative electrode active material within a specific range in a non-aqueous electrolyte secondary battery.

DETAILED DESCRIPTION OF THE EMBODIMENTS

Figure 1:
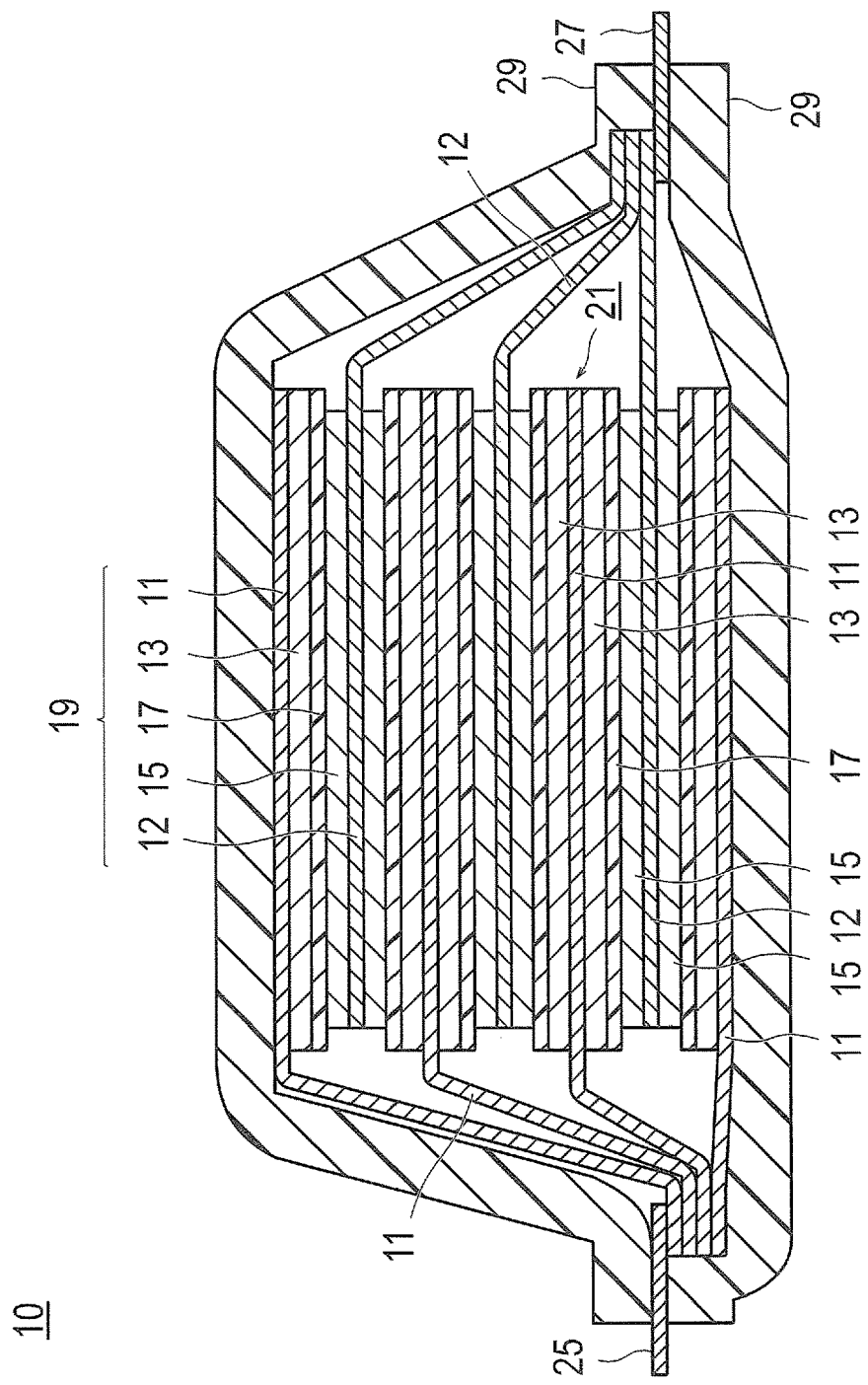
FIG. 1 is a cross sectional schematic view illustrating a basic structure of a flat type (laminated type) non-bipolar type non-aqueous electrolyte lithium ion secondary battery according to an embodiment of a non-aqueous electrolyte lithium ion secondary battery.

An embodiment of a non-aqueous electrolyte secondary battery according to the present invention is characterized by including a negative electrode containing a carbon-based negative electrode active material, an electrolyte layer, and a positive electrode containing a positive electrode active material, in which a tap density of the negative electrode active material is 0.96 g/cc or more.

The non-aqueous electrolyte secondary battery of the present embodiment has the above structure, that is, the tap density of the negative electrode active material is within a specific range, and a negative electrode active material particle having small and less protrusions and a uniform shape is thereby selected. Therefore, a local reaction of the negative electrode active material particle due to an electrolytic solution is suppressed during charging and discharging, and therefore deterioration of battery performance due to local deterioration of negative electrode active material particles can be suppressed.

Next, a description will be made of a non-aqueous electrolyte lithium ion secondary battery as the present embodiment of the non-aqueous electrolyte secondary battery, but it is not limited thereto. Meanwhile, the same elements are given with the same symbols for the descriptions of the drawings, and overlapped descriptions are omitted. Further, note that dimensional ratios in the drawings are exaggerated for the description, and are different from actual ratios in some cases.

FIG. 1 is a cross-sectional view schematically illustrating the basic constitution of a non-aqueous electrolyte lithium ion secondary battery which is a flat type (stack type) and not a bipolar type (hereinbelow, it is also simply referred to as a "stack type battery"). As illustrated in FIG. 1, the stack type battery 10 according to this embodiment has a structure in which a power generating element 21 with a substantially rectangular shape, in which a charge and discharge reaction actually occurs, is sealed inside of a battery outer casing 29. Herein, the power generating element 21 has a constitution in which a positive electrode, the separator 17, and a negative electrode are stacked. Meanwhile, the separator 17 has a non-aqueous electrolyte (for example, liquid electrolyte) therein. The positive electrode has a structure in which the positive electrode active material layer 13 is disposed on both surfaces of the positive electrode current collector 11. The negative electrode has a structure in which the negative electrode active material layer 15 is disposed on both surfaces of the negative electrode current collector 12. Specifically, one positive electrode active material layer 13 and the neighboring negative electrode active material layer 15 are disposed to face each other via the separator 17, and the negative electrode, the electrolyte layer, and the positive electrode are stacked in this order. Accordingly, the neighboring positive electrode, electrolyte layer and negative electrode form one single battery layer 19. It can be also said that, as plural single barrier layers 19 are stacked, the stack type battery 10 illustrated in FIG. 1 has a constitution in which electrically parallel connection is made among them.

Meanwhile, on the outermost layer positive electrode current collector which is present on both outermost layers of the power generating element 21, the positive electrode active material layer 13 is disposed only on a single surface. However, an active material layer may be formed on both surfaces. Namely, not only a current collector exclusive for an outermost layer in which an active material layer is formed on a single surface can be achieved but also a current collector having an active material layer on both surfaces can be directly used as a current collector of an outermost layer. Furthermore, by reversing the arrangement of the positive electrode and negative electrode of FIG. 1, it is also possible that the outer most layer negative electrode current collector is disposed on both outermost layers of the power generating element 21 and a negative electrode active material layer is disposed on a single surface or both surfaces of the same outermost layer negative electrode current collector.

The positive electrode current collector 11 and negative electrode current collector 12 have a structure in which each of the positive electrode current collecting plate (tab) 25 and negative electrode current collecting plate (tab) 27, which conductively communicate with each electrode (positive electrode and negative electrode), is attached and inserted to the end part of the battery outer casing 29 so as to be led to the outside of the battery outer casing 29. If necessary, each of the positive electrode current collecting plate 25 and negative electrode current collecting plate 27 can be attached, via a positive electrode lead and negative electrode lead (not illustrated), to the positive electrode current collector 11 and negative electrode current collector 12 of each electrode by ultrasonic welding or resistance welding.

Meanwhile, although a stack type battery which is a flat type (stack type), not a bipolar type is illustrated in FIG. 1, it can be also a bipolar type battery containing a bipolar type electrode which has a positive electrode active material layer electrically bound to one surface of a current collector and a negative electrode active material layer electrically bound to the opposite surface of the current collector. In that case, one current collector plays both roles of a positive electrode current collector and a negative electrode current collector. That is, as in the form of FIG. 1, a positive electrode or negative electrode active material layer containing a positive electrode or negative electrode active material is formed on both surfaces of the positive electrode or negative electrode current collector. Meanwhile, in an electrode of a bipolar type secondary battery (bipolar type electrode), a positive electrode active material layer containing a positive electrode active material is formed on one surface of a current collector, and a negative electrode active material layer containing a negative electrode active material is formed on the other surface. That is, the electrode has a form in which a positive electrode (positive electrode active material layer) and a negative electrode (negative electrode active material layer) are integrated through the current collector. The active material layer can includes a conductive aid, a binder, and furthermore an additive such as an electrolyte salt (lithium salt) and an ion conductive polymer as an electrolyte, if necessary, in addition to the active material.

Hereinafter, each member will be described in more detail.

[Electrode]

A positive electrode and a negative electrode have function for generating electric energy through transfer of lithium ions. In the positive electrode, a positive electrode active material layer 15 essentially containing a positive electrode active material is disposed on both surfaces of a positive electrode current collector 12. In the negative electrode, a negative electrode active material layer 13 essentially containing a negative electrode active material is disposed on both surfaces of a negative electrode current collector 11.

(Current Collector)

As a material to form the negative electrode current collector 11 or the positive electrode current collector 12, there is no particular limitation as long as the material is a conductive (electronically conductive) material capable of exhibiting current collecting function effectively.

As a material to form the current collector, for example, a metal or a resin obtained by adding a conductive filler to a conductive polymer material or a non-conductive polymer material can be used. The metal is used suitably from a viewpoint of conductivity. The resin obtained by adding the conductive filler is used suitably from a viewpoint of reduction in weight.

Specific examples of the material (metal) to form the current collector include aluminum (Al), nickel (Ni), iron (Fe), stainless steel (SUS), titanium (Ti), and copper (Cu). In addition to these materials, a clad material of nickel (Ni) and aluminum (Al), a clad material of copper (Cu) and aluminum (Al), a plating material of a combination of these metals, or the like can be preferably used. A foil obtained by coating a surface of a metal with aluminum (Al) may be used. Among these materials, aluminum (Al), stainless steel (SUS), copper (Cu), and nickel (Ni) are preferable from a viewpoint of electronic conductivity, battery operating potential, or the like.

Moreover, examples of the conductive polymer material include polyaniline, polypyrrole, polythiophene, polyacetylene, polyparaphenylene, polyphenylene vinylene, polyacrylonitrile, and polyoxadiazole. Such a conductive polymer material is advantageous in terms of facilitation of a manufacturing process or reduction in weight of the current collector because the conductive polymer material has sufficient conductivity without adding a conductive filler.

Examples of the non-conductive polymer material include polyethylene (PE; high density polyethylene (HDPE), low density polyethylene (LDPE), or the like), polypropylene (PP), polyethylene terephthalate (PET), polyether nitrile (PEN), polyimide (PI), polyamideimide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), and polystyrene (PS). Such a non-conductive polymer material has excellent potential resistance or solvent resistance.

A conductive filler can be added if necessary to the conductive polymer material or the non-conductive polymer material. In particular, when a resin serving as a base material of the current collector is made only of the non-conductive polymer, a conductive filler is essentially required in order to impart conductivity to the resin. The conductive filler can be used without particular limitation as long as the conductive filler has conductivity. Examples of a material having excellent conductivity, potential resistance, or lithium ion blocking include a metal and conductive carbon.

Preferable examples of the metal used for the conductive filler include at least one metal selected from the group consisting of nickel (Ni), titanium (Ti), aluminum (Al), copper (Cu), platinum (Pt), iron (Fe), chromium (Cr), tin (Sn), zinc (Zn), indium (In), antimony (Sb), and potassium (K), or an alloy containing these metals, or a material containing a metal oxide. Furthermore, preferable examples of the conductive carbon used for the conductive filler include a material containing at least one member selected from the group consisting of acetylene black, vulcan, black pearl, carbon nanofiber, Ketjen black, carbon nanotube, carbon nanohorn, carbon nanoballoon, and fullerene. An additive amount of the conductive filler is not particularly limited as long as sufficient conductivity can be imparted to the current collector. In general, the additive amount is about 5 to 35% by mass.

However, the material is not limited to these materials, but a conventionally known material used as a current collector for a lithium ion secondary battery can be used.

A size of the current collector is determined according to use of the battery. For example, a current collector having a large area is used for a large-sized battery requiring a high energy density. A thickness of the current collector is not particularly limited. The thickness of the current collector is usually about 1 to 100 μm. A shape of the current collector is also not particularly limited. In addition to a current collector foil and film (metallic foil or a conductive resin film), a mesh shape (expanded grid, or the like) or the like can be used.

[Negative Electrode Active Material Layer]

The negative electrode active material layer 13 includes a negative electrode active material, and further includes a conductive aid, a binder, and furthermore another additive such as an electrolyte salt (lithium salt) and an ion conductive polymer as an electrolyte, if necessary.

(Negative Electrode Active Material)

The negative electrode active material of the present embodiment has a tap density within the above specific range. The negative electrode active material preferably has the degree of compression and a Hausner ratio within a specific range described below. This is because this allows an effect of the present invention to exhibit more effectively.

(a) Tap Density

In the present embodiment, the tap density of the negative electrode active material is 0.96 g/cc or more, preferably 0.96 g/cc or more and 1.10 g/cc or less, and more preferably 0.99 g/cc or more and 1.10 g/cc or less. When the tap density of the negative electrode active material is within the above range, selection of a negative electrode active material particle having a uniform shape can be controlled, a local reaction of the negative electrode active material particle due to an electrolyte can be suppressed during charging and discharging, and therefore deterioration of battery performance due to local deterioration of the negative electrode active material can be suppressed. That is, reduction in a charge-discharge capacity of a battery can be suppressed by suppression of local deterioration of the negative electrode active material, and the capacity retention ratio of the battery can be improved. Meanwhile, it has been found that the negative electrode active material having a tap density outside the above range (less than 0.96 g/cc) cannot endure practical use.

Figure 2A:
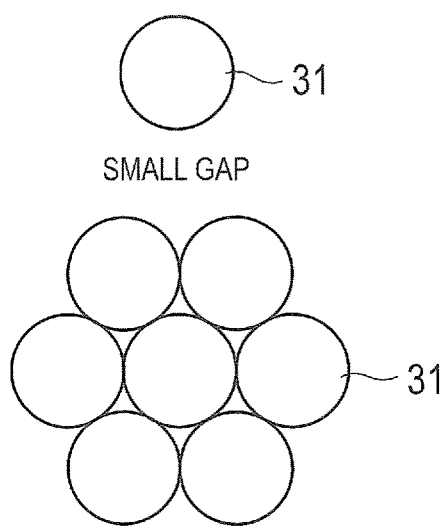
FIG. 2(A) is a cross sectional view schematically illustrating a negative electrode active material having a high tap density (0.96 g/cc or more) of the present embodiment in a state of a single particle and in a state after particles are tapped according to a method for measuring the tap density.

FIG. 2(A) is a cross sectional view schematically illustrating a negative electrode active material having a high tap density (0.96 g/cc or more) of the present embodiment in a state of a single particle and in a state after particles are tapped according to a method for measuring the tap density.

Figure 2B:
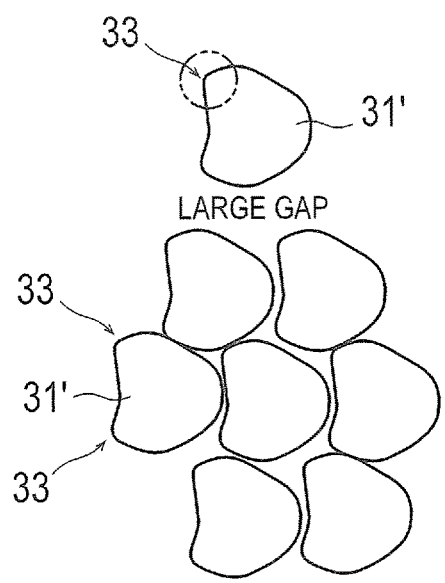
FIG. 2(B) is a cross sectional view schematically illustrating an existing negative electrode active material having a low tap density (less than 0.96 g/cc) in a state of a single particle and in a state after particles are tapped according to the method for measuring the tap density.

FIG. 2(B) is a cross sectional view schematically illustrating an existing negative electrode active material having a low tap density (less than 0.96 g/cc) in a state of a single particle and in a state after particles are tapped according to the method for measuring the tap density. In the existing negative electrode active material illustrated in FIG. 2(B), a portion protruding toward the outside from a negative electrode active material particle 31' is a protrusion (portion surrounded by a dotted line in FIG. 2(B)) 33, and the negative electrode active material has a nonuniform shape (irregular shape) having a large number of the protrusions 33. In this case, a gap between the particles 31' after being tapped is large. When the protrusion is cracked or collapsed by local deterioration of the protrusion 33 due to charging and discharging, the large gap between the particles 31' cannot be maintained, and the active material particles 31' move so as to fill the gap. The active material layer is thereby cracked. Furthermore, this case encloses such a problem as easy occurrence of falling the active material. FIG. 2(B) simply exemplifies a case where several protrusions are present at a cut surface, but actually, more protrusions are present generally. Meanwhile, a coating is formed on a particle surface of the negative electrode active material during charging and discharging. The shape of the negative electrode active material has an influence on formation of the coating on the particle surface of the negative electrode active material. Uniformity of the coating is involved in uniformity of a chemical reaction in the particle surface of the negative electrode active material. The low uniformity locally deteriorates the negative electrode active material during charging and discharging to reduce a charge-discharge capacity. Therefore, in the nonuniform shape (irregular shape) having a large number of the protrusions 33 as in FIG. 2(B), the uniformity of the coating is low. Therefore, the negative electrode active material particle 31' is locally deteriorated during charging and discharging to reduce the charge-discharge capacity. That is, in the nonuniform shape having a large number of the protrusions 33, uniformity of the coating is extremely low in the protrusions 33 and therearound, and a region in which the coating is not formed tends to be present in the protrusions 33 and therearound. In addition, the surface area (reaction area or contact area) of the protrusions 33 is very large, and a reaction with an electrolyte is locally promoted rapidly during charging and discharging. At this time, the local reaction with an electrolyte proceeds significantly in the protrusions 33 in the region in which the coating is not formed and therearound. As a result, in the protrusions 33, local deterioration of the active material (for example, inactivation due to a distortion, collapse, or the like of a crystal structure) proceeds rapidly due to repeated charging and discharging, and the capacity retention ratio of the secondary battery is reduced disadvantageously. Meanwhile, the negative electrode active material of the present embodiment illustrated in FIG. 2(A) has a tap density of the negative electrode active material within a specific high range, and the negative electrode active material particle 31 having small and less protrusions and a uniform shape is thereby selected. FIG. 2(A) simply illustrates an ideal shape having no protrusion at a cut surface. In this case, a gap between the particles 31 after being tapped is small. In this way, the negative electrode active material particle 31 having small and less protrusions and a uniform shape is selected. A local reaction of the negative electrode active material particle 31 due to an electrolyte can be thereby suppressed during charging and discharging, and therefore deterioration of battery performance due to local deterioration of the negative electrode active material can be suppressed. That is, reduction in a charge-discharge capacity of a battery can be suppressed by suppression of local deterioration of the negative electrode active material, and the capacity retention ratio of the battery can be improved. The negative electrode active material of the present embodiment is fine even when the primary particle has a problem (nonuniform shape having many protrusions) but when the secondary particle (particle 31 in FIG. 2(A)) has no problem (nonuniform shape having many protrusions). A shape (refer to FIG. 2(A)) having no protrusion finally regardless of the primary particle or the secondary particle is particularly preferable.

As a method for adjusting the tap density of the negative electrode active material within the above range, for example, the method can be performed (adjusted) according to conditions when a carbon-based negative electrode active material particle such as graphite (black lead) and hard carbon is generated and pulverized so as to obtain a negative electrode active material particle having small and less protrusions and a uniform shape. For example, it is only required to adjust a rotating member of a pulverizer, a rotational speed thereof, and the like such that the protrusion of the negative electrode active material particle is small and less and has a uniform particle shape without giving a damage (distortion, crack, or the like of the crystal structure) to the negative electrode active material particle main body through collision, friction, or the like during pulverization. For example, when a strong rupture (shear) stress is applied to a scale-like or massive carbon material such as graphite and hard carbon, a cut surface rather becomes sharp (serrated) (protrusions are formed easily). Therefore, during pulverization, it is preferable to perform pulverization such that the cut surface does not become sharp (serrated) (such that no protrusions are formed) by performing pulverization gradually while a relatively weak rupture (shear) stress is applied by reducing a rotational speed of a pulverizer and a relatively weak friction (wear) force is further applied using a rotor or the like. It is more preferable to confirm a correlation between the tap density and a bulk density, and the rotating member of the pulverizer, the rotor thereof, the rotational speed thereof, and the like through preliminary experiments according to the kind of the negative electrode active material (hardness, protrusion shape, the number of protrusions, and the like).

Here, in the method for measuring the tap density of the negative electrode active material, a predetermined amount of powder (negative electrode active material) is put into a container to measure the tap density using a tapping device. In detail, measurement can be performed in accordance with JIS Z 2512:2012.

(b) Degree of Compression

Figure 3A:
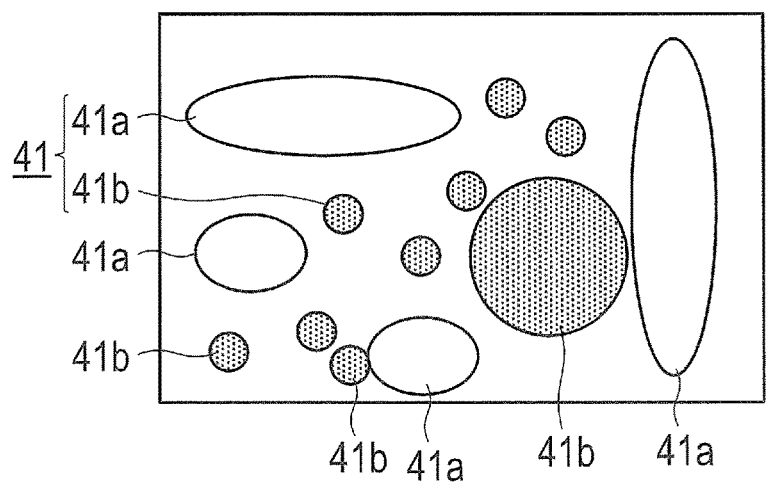
FIG. 3(A) is a schematic diagram schematically illustrating a state before tapping according to the method for measuring the tap density when the tap density of the whole of negative electrode active material particles is low (less than 0.96 g/cc) and the degree of compression and a Hausner ratio are low.
Figure 3B:
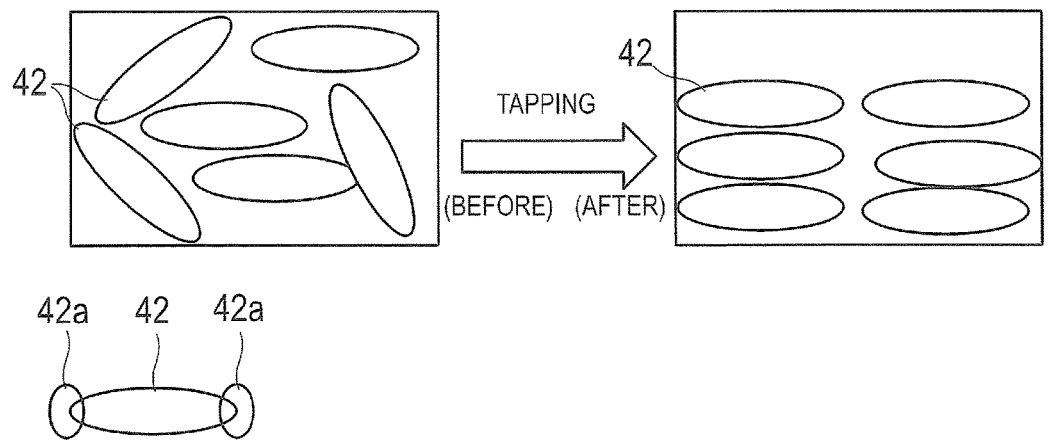
FIG. 3(B) is a schematic diagram schematically illustrating states before and after tapping according to the method for measuring the tap density when the tap density of the whole of negative electrode active material particles is high (0.96 g/cc or more) and the degree of compression and the Hausner ratio are low.
Figure 3C:
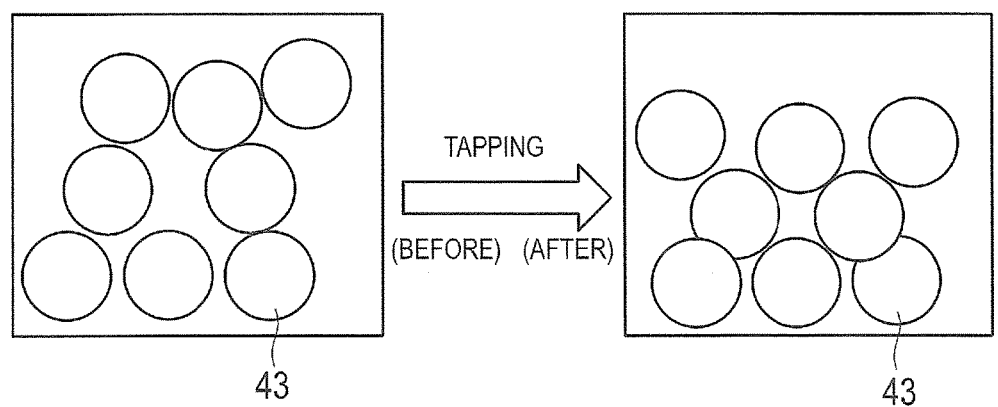
FIG. 3(C) is a schematic diagram schematically illustrating states before and after tapping according to the method for measuring the tap density when the tap density of the whole of negative electrode active material particles is high (0.96 g/cc or more) and the degree of compression and the Hausner ratio are high.

In the present embodiment, the degree of compression of the negative electrode active material is preferably 0.1 or more, more preferably 0.26 or more, still more preferably 0.27 or more, and particularly preferably 0.275 or more. When the degree of compression of the negative electrode active material is within the above range, selection of negative electrode active material particles having a more uniform shape can be controlled. Particularly, by setting the degree of compression of the negative electrode active material within the above preferable range, only the negative electrode active material particles having a more uniform shape remains. Therefore, a local reaction of the negative electrode active material particles due to an electrolyte is further suppressed during charging and discharging, and therefore deterioration of battery performance due to local deterioration of the negative electrode active material can be further suppressed. That is, reduction in a charge-discharge capacity of a battery can be further suppressed by suppression of local deterioration of the negative electrode active material, and the capacity retention ratio of the battery can be further improved. The above will be described with reference to the drawings. FIG. 3(A) is a schematic diagram schematically illustrating a state before tapping according to a method for measuring the tap density when the tap density of the whole of negative electrode active material particles is low (less than 0.96 g/cc) and the degree of compression and the Hausner ratio are low. FIG. 3(B) is a schematic diagram schematically illustrating states before and after tapping according to the method for measuring the tap density when the tap density of the whole of negative electrode active material particles is high (0.96 g/cc or more) and the degree of compression and the Hausner ratio are low. FIG. 3(C) is a schematic diagram schematically illustrating states before and after tapping according to the method for measuring the tap density when the tap density of the whole of negative electrode active material particles is high (0.96 g/cc or more) and the degree of compression and the Hausner ratio are high. As illustrated in FIG. 3(A), when there is no uniformity in the shape or the size of the whole of negative electrode active material particles 41, the tap density of the whole of the negative electrode active material particles 41 is low, and the degree of compression (and the Hausner ratio) is also low. Therefore, a burden is concentrated in a particle 41a. This leads to reduction in the active material and increase in the burden on another particle 41b. In detail, the burden is concentrated in the particle 41a having many protrusions and a nonuniform shape (irregular shape). This cracks or collapses a protrusion by local deterioration of the protrusion due to charging and discharging, and thereby reduces the active material. In such a case, a large gap generated around the cracked or collapsed particle 41a having an irregular shape cannot be maintained. The other particle 41b moves so as to fill the gap, leading to increase in the burden on the other particle 41b. As a result, this leads to reduction in the active material of the other particle 41b, and the active material layer is cracked, and furthermore the active material is separated. Next, as illustrated in FIG. 3(B), when the shape of the whole of negative electrode active material particles 42 is uniform but a distortion remains as a single particle, the tap density is high but the degree of compression (and the Hausner ratio) is low. In the negative electrode active material particle 42, a burden is applied on some portions of the particle 42 (portion surrounded by a circle in FIG. 3(B); protrusion 42a). This cracks or collapses a protrusion by local deterioration of the protrusion of the particle 42 due to charging and discharging, and thereby reduces a reaction region in a single particle. As a result, this leads to slight reduction in the capacity retention ratio. Meanwhile, as illustrated in FIG. 3(C), when both the whole of negative electrode active material particles 43 and a single particle have uniformity, the tap density is high and the degree of compression (and the Hausner ratio) is high. That is, by setting the tap density highly and setting the degree of compression of the negative electrode active material within the above preferable range, particularly to 0.27 or more (and setting the Hausner ratio to 0.39 or more), only the negative electrode active material particle 43 having a more uniform shape remains, and both the whole of the particles 43 and a single particle have uniformity. In the negative electrode active material particle 43, an equal burden is applied to the entire particle 43, a low burden is applied to any part, and deterioration hardly occurs. As a result, as described above, a local reaction of the negative electrode active material particles due to an electrolyte is further suppressed during charging and discharging, and therefore deterioration of battery performance due to local deterioration of the negative electrode active material can be further suppressed. That is, reduction in a charge-discharge capacity of a battery can be further suppressed by suppression of local deterioration of the negative electrode active material, and the capacity retention ratio of the battery can be further improved (refer to Example 1 and Examples 3 and 4 in Table 1 of Examples by comparison). An upper limit value of the degree of compression of the negative electrode active material is not particularly limited, but is preferably 0.5 or less, and more preferably 0.4 or less.

As a method for adjusting the degree of compression of the negative electrode active material within the above range, for example, the method can be performed (adjusted) according to conditions when a carbon-based negative electrode active material particle such as graphite (black lead) and hard carbon is generated and pulverized so as to obtain a negative electrode active material particle having small and less protrusions and a more uniform shape. For example, it is only required to adjust a rotating member of a pulverizer, a rotational speed thereof, and the like such that the protrusion of the negative electrode active material particles is smaller and less and has a more uniform particle shape without giving a damage (distortion, crack, or the like of the crystal structure) to the negative electrode active material particle main body through collision, friction, or the like during pulverization. For example, when a strong rupture (shear) stress is applied to a scale-like or massive carbon material such as graphite and hard carbon, a cut surface rather becomes sharp (serrated) (protrusions are formed easily). Therefore, during pulverization, it is preferable to perform pulverization such that the cut surface does not become sharp (serrated) (such that no protrusions are formed) by performing pulverization gradually while a relatively weak rupture (shear) stress is applied by reducing a rotational speed of a pulverizer and a relatively weak friction (wear) force is further applied using a rotor or the like. It is more preferable to confirm a correlation between the degree of compression (in detail, the tap density and the bulk density), and the rotating member of the pulverizer, the rotor thereof, the rotational speed thereof, and the like through preliminary experiments according to the kind of the negative electrode active material (hardness, protrusion shape, the number of protrusions, and the like).

Here, the degree of compression of the negative electrode active material is calculated by "the degree of compression=(tap density-bulk density)/tap density" by using a volume before measurement of the tap density, that is, in a state in which a predetermined amount of powder (negative electrode active material) is put into a container before being tapped as "bulk density". The method for measuring the tap density has been described above.

(c) Hausner Ratio

In the present embodiment, the Hausner ratio of the negative electrode active material is preferably 1.1 or more, more preferably 1.37 or more, still more preferably 1.38 or more, particularly preferably 1.39 or more, and most preferably 1.4 or more. When the Hausner ratio of the negative electrode active material is within the above range, selection of the negative electrode active material particle having a more uniform shape can be controlled. Particularly, by setting the Hausner ratio of the negative electrode active material within the above preferable range, only negative electrode active material particles having a more uniform shape remains. Therefore, a local reaction of the negative electrode active material particles due to an electrolyte can be further suppressed during charging and discharging, and therefore deterioration of battery performance due to local deterioration of the negative electrode active material can be further suppressed. That is, reduction in a charge-discharge capacity of a battery can be further suppressed by suppression of local deterioration of the negative electrode active material, and the capacity retention ratio of the battery can be further improved. The above will be described with reference to the FIG. 3. As illustrated in FIG. 3(A), when there is no uniformity in the shape or the size of whole of the negative electrode active material particles 41, the tap density of the whole of the negative electrode active material particles 41 is low, and (the Hausner ratio and the degree of compression are also low). Therefore, a burden is concentrated in a particle 41a. This leads to reduction in the active material and increase in the burden on another particle 41b. In detail, the burden is concentrated in the particle 41a having many protrusions and a nonuniform shape (irregular shape). This cracks or collapses a protrusion by local deterioration of the protrusion due to charging and discharging, and thereby reduces the active material. In such a case, a large gap generated around the cracked or collapsed particle 41a having an irregular shape cannot be maintained. The other particle 41b moves so as to fill the gap, leading to increase in the burden on the other particle 41b. As a result, this leads to reduction in the active material of the other particle 41b, and the active material layer is cracked, and furthermore the active material is separated. Next, as illustrated in FIG. 3(B), when the shape of the whole of the negative electrode active material particles 42 is uniform but a distortion remains as a single particle, the tap density is high but the Hausner ratio (and the degree of compression) is low. In the negative electrode active material particle 42, a burden is applied on some portions of the particle 42 (portion surrounded by a circle in FIG. 3(B); protrusion). This cracks or collapses a protrusion by local deterioration of the protrusion of the particle 42 due to charging and discharging, and thereby reduces a reaction region in a single particle. As a result, this leads to slight reduction in the capacity retention ratio. Meanwhile, as illustrated in FIG. 3(C), when both the whole of the negative electrode active material particles 43 and a single particle thereof have uniformity, the tap density is high and the Hausner ratio (and the degree of compression) is high. That is, by setting the tap density highly and setting the Hausner ratio of the negative electrode active material within the above preferable range, particularly to 0.39 or more (and setting the degree of compression to 0.27 or more), only the negative electrode active material particle 43 having a more uniform shape remains, and both the whole of the particles 43 and a single particle thereof have uniformity. In the negative electrode active material particle 43, an equal burden is applied to the entire particle 43, a low burden is applied to any part, and deterioration hardly occurs. As a result, as described above, a local reaction of the negative electrode active material particles due to an electrolyte can be further suppressed during charging and discharging, and therefore deterioration of battery performance due to local deterioration of the negative electrode active material can be further suppressed. That is, reduction in a charge-discharge capacity of a battery can be further suppressed by suppression of local deterioration of the negative electrode active material, and the capacity retention ratio of a battery can be further improved (refer to Example 1 and Examples 3 and 4 in Table 1 of Examples by comparison). An upper limit value of the Hausner ratio of the negative electrode active material is not particularly limited, but is preferably 1.6 or less, and more preferably 1.5 or less.

The Hausner ratio of the negative electrode active material can be adjusted within the above range in a similar manner to the method for adjusting the tap density within the above range by a calculation formula of the Hausner ratio described below. That is, for example, the method can be performed (adjusted) according to conditions when a carbon-based negative electrode active material particle such as graphite (black lead) and hard carbon is generated and pulverized so as to obtain a negative electrode active material particle having small and less protrusions and a more uniform shape. For example, it is only required to adjust a rotating member of a pulverizer, a rotational speed thereof, and the like such that the protrusion of the negative electrode active material particles is smaller and less and has a more uniform particle shape without giving a damage (distortion, crack, or the like of the crystal structure) to the negative electrode active material particle main body through collision, friction, or the like during pulverization. For example, when a strong rupture (shear) stress is applied to a scale-like or massive carbon material such as graphite and hard carbon, a cut surface rather becomes sharp (serrated) (protrusions are formed easily). Therefore, during pulverization, it is preferable to perform pulverization such that the cut surface does not become sharp (serrated) (such that no protrusions are formed) by performing pulverization gradually while a relatively weak rupture (shear) stress is applied by reducing a rotational speed of a pulverizer and a relatively weak friction (wear) force is further applied using a rotor or the like. It is more preferable to confirm a correlation between the Hausner ratio (in detail, the tap density and the bulk density), and the rotating member of the pulverizer, the rotor thereof, the rotational speed thereof, and the like through preliminary experiments according to the kind of the negative electrode active material (hardness, protrusion shape, the number of protrusions, and the like).

Here, the Hausner ratio of the negative electrode active material is calculated by "Hausner ratio=tap density/bulk density". The method for measuring the tap density and the bulk density has been described above.

(d) Material (Kind) for Negative Electrode Active Material

The negative electrode active material which can be used in the present embodiment is not particularly limited as long as the material is lithium, a lithium alloy, or a material capable of occluding and releasing lithium. However, preferable examples thereof mainly include a carbon material (carbon-based negative electrode active material) such as a carbon material (including a carbon material containing 10% by mass or less silicon nanoparticles) containing graphite that is high crystalline carbon (natural graphite, artificial graphite, or the like), low crystalline carbon (soft carbon and hard carbon), carbon black (Ketjen black, acetylene black, channel black, lamp black, oil furnace black, thermal black, or the like), fullerene, carbon nanotube, carbon nanofiber, carbon nanohorn, or carbon fibril. Of course, a carbon material other than the above materials (carbon-based negative electrode active material) may be used. The negative electrode active material is not limited to the above carbon materials (carbon-based negative electrode active materials). A conventionally known carbon material used as a carbon material (carbon-based negative electrode active material) for a lithium ion secondary battery can be used as a main component. These carbon materials (carbon-based negative electrode active materials) may be used singly or in combination of two or more kinds thereof. Among the above carbon materials (carbon-based negative electrode active materials), it is preferable to use black lead (graphite) having excellent cycle characteristics, a large amount for occluding and releasing lithium, and an excellent charge-discharge capacity or the like because a lithium dendrite deposition is hardly generated and an internal short circuit can be prevented. The black lead (graphite) active material is not particularly limited. Graphite powder such as a natural graphite particle, an artificial graphite particle obtained by graphitizing coke, and an artificial graphite particle obtained by graphitizing an organic polymer, pitch, or the like can be used. In addition, the following (a) to (c) or the like are included in the above carbon material (carbon-based negative electrode active material) and furthermore the graphite active material from a viewpoint of suppressing deterioration of the active material, suppressing decomposition of an electrolytic solution, or the like. That is, (a) a carbon material, particularly a material in which a surface of graphite is coated with an amorphous carbon layer is included. Alternatively, (b) a carbon material, particularly a material in which a surface of graphite is coated with a deposit or the like represented by a solid electrolyte interface (SEI) formed by charging and discharging is included. Alternatively, (c) a carbon material, particularly a material having a coating layer (coating) formed by a reaction with a sulfonic acid-based compound (additive) in an electrolyte composition during charging and discharging on a surface of graphite, or the like is included. However, in the present embodiment, they are not limited to these materials in any way. The above conventionally known carbon materials (carbon-based negative electrode active materials) and furthermore the graphite active materials are also included in the technical scope of the present embodiment as long as being able to exhibit the above effect of the present invention effectively.

The content of the above carbon material (carbon-based negative electrode active material) is preferably 80 to 100% by mass, more preferably 95 to 100% by mass, and still more preferably 100% by weight with respect to the total amount of the positive electrode active material. The negative electrode active material which can be used in the present embodiment may further contain a single element for alloying with lithium, such as silicon (Si), germanium (Ge), tin (Sn), lead (Pb), aluminum (Al), indium (In), zinc (Zn), hydrogen (H), calcium (Ca), strontium (Sr), barium (Ba), ruthenium (Ru), rhodium (Rh), iridium (Ir), palladium (Pd), platinum (Pt), silver (Ag), gold (Au), cadmium (Cd), mercury (Hg), gallium (Ga), thallium (Tl), carbon (C), nitrogen (N), antimony (Sb), bismuth (Bi), oxygen (O), sulfur (S), selenium (Se), tellurium (Te), and chlorine (Cl), and an oxide containing these elements (silicon monoxide (SiO), $SiO_x$ (0<x<2), tin dioxide ($SnO_2$), $SnO_x$ (0<x<2), $SnSiO_3$, or the like), and a carbide (silicon carbide (SiC) or the like), and the like; a metal (alloy) material such as a lithium metal (including a lithium alloy); a lithium-transition metal composite oxide such as a lithium-titanium composite oxide (lithium titanate: $Li_4Ti_5O_{12}$), and the like in addition to the above carbon material (carbon-based negative electrode active material). Of course, a negative electrode active material other than the above materials may be used. The negative electrode active material is not limited to the above negative electrode active materials. A conventionally known material used as a negative electrode active material for a lithium ion secondary battery can be used. If necessary, two or more negative electrode active materials may be used in combination. A carbon material is preferably used singly.

When a carbon material is used together with a lithium-transition metal composite oxide or a metal (alloy) material, these compounds are excellent because expansion and shrinkage thereof due to charging and discharging are smaller than those of a single element such as Si and Sn, and an oxide and a carbide containing these elements, and the above effect due to the tap density or the like is exhibited easily and effectively. Meanwhile, when a carbon material is used together with a single element such as Si and Sn, and an oxide and a carbide containing these elements, these compounds are excellent because a high capacity and output characteristics are obtained by applying known measures with respect to large expansion and shrinkage of Si, Sn, or the like.

(e) Average Particle Diameter of Negative Electrode Active Material

The average particle diameter of the negative electrode active material is not particularly limited as long as the above effect of the present invention can be exhibited effectively, but is preferably 5 µm or more and 74 µm or less, and more preferably 12 µm or more and 33 µm or less. A case where the average particle diameter of the negative electrode active material is within the above range is excellent because selection of the negative electrode active material particle having a more uniform shape can be controlled, and performance as a battery can be further improved by making the particle diameter of the active material uniform (setting the average particle diameter within the above range). Herein, the term "particle diameter" means a maximum distance of distances between any two points on a contour line of an active material particle (observation surface) observed using an observation means such as a scanning electron microscope (SEM) and a transmission electron microscope (TEM). As a value of the "average particle diameter", a value calculated as an average value of particle diameters of particles observed in several to several tens visual fields using an observation means such as a scanning electron microscope (SEM) and a transmission electron microscope (TEM) is used. A particle diameter and an average particle diameter of another component can be defined similarly. A particle form of the negative electrode active material in the present embodiment in a stage of actual use may be a particle (primary particle), for example, not agglomerated or bonded, may be a secondary particle formed, for example, by agglomerating or bonding the primary particles, or may be a mixed form in which primary particles are included in a part of the secondary particles. On the contrary, the particle form may be a mixed form in which secondary particles are included in a part of the primary particles. That is, as the negative electrode active material, for an active material particle (powder) in a stage of actual use, requirements of the tap density, the degree of compression, the Hausner ratio, and the like, and the average particle diameter or the like are measured and calculated. Therefore, the measurement and calculation can be performed regardless of the above particle forms.

(f) Shape of Negative Electrode Active Material

As a shape of the negative electrode active material (particle) in the present embodiment, a uniform particle shape having small and less protrusions is desirable compared to the shape of the existing graphite active material as described in WO 2002/059040 A, that is, an irregular nonuniform shape having many protrusions. Due to this, in a protrusion (particularly in a sharp tip, a bent portion, or the like) having a large surface area, such as the particle shape of the existing graphite active material, a reaction with an electrolyte is locally promoted during charging and discharging, local deterioration of the active material proceeds rapidly due to repeated charging and discharging, and a problem that battery performance is lowered can be solved. That is, the negative electrode active material particle having small and less protrusions and a uniform shape is selected as in the present embodiment. A local reaction of negative electrode active material particles due to an electrolytic solution is thereby suppressed during charging and discharging, and therefore deterioration of battery performance due to local deterioration of negative electrode active material particles can be suppressed.

(g) Content of Negative Electrode Active Material

In the negative electrode active material layer, the content of the negative electrode active material is preferably 80 to 99.5% by weight, and preferably 85 to 99.5% by weight.

[Positive Electrode Active Material Layer]

The positive electrode active material layer 15 includes a positive electrode active material, and further includes a conductive aid, a binder, and furthermore another additive such as an electrolyte salt (lithium salt) and an ion conductive polymer as an electrolyte, if necessary.

(Positive Electrode Active Material)

Examples of the positive electrode active material include a lithium-transition metal composite oxide such as $LiMn_2O_4$, $LiCoO_2$, $LiNiO_2$, $Li(Ni—Mn—Co)O_2$ and a compound in which part of the transition metals is replaced with other element, a lithium-transition metal phosphate compound, and a lithium-transition metal sulfate compound. Depending on the case, two or more kinds of a positive electrode active material can be used in combination. As a preferred example, a lithium-transition metal composite oxide is used as a positive electrode active material from the viewpoint of capacity and output characteristics. As a more preferred example, $Li(Ni—Mn—Co)O_2$ and a compound in which part of the transition metals is replaced with other element (hereinbelow, also simply referred to as the "NMC composite oxide") are used. The NMC composite oxide has a layered crystal structure in which a lithium atom layer and a transition metal (Mn, Ni, and Co are arranged with regularity) atom layer are alternately stacked via an oxygen atom layer, one Li atom is included per atom of transition metal and extractable Li amount is twice the amount of spinel lithium manganese oxide, that is, as the supply power is two times higher, it can have high capacity. In addition, the NMC composite oxide has a higher thermal stability than $LiNiO_2$, and therefore is particularly advantageous among lithium-transition metal composite oxides used as the positive electrode active material. Furthermore, in the present embodiment, a part of Mn is eluted after repeated charge-discharge cycles by using a lithium-transition metal composite oxide containing Mn in the positive electrode active material, specifically $LiMn_2O_4$ (hereinafter, also referred to as LMO composite oxide) or the like, and an Mn ion which has reached a negative electrode side is inactivated, for example, by reacting with the existing protrusion having a nonuniform shape in the negative electrode active material, leading to local deterioration (capacity deterioration) disadvantageously. On the other hand, in the present embodiment, even when the eluted Mn reaches a negative electrode side, such a negative electrode active material having a uniform shape as described above is selected, and the protrusion easily reacting with the Mn ion is thereby small and less, and has a uniform shape. Therefore, an influence by the Mn ion can be suppressed largely. When an electrolyte containing a sulfonic acid-based compound in a composition is used as the electrolyte, a firmer coating can be generated on a surface of the negative electrode active material, an influence by the eluted Mn can be minimized, and deterioration itself of the surface of the negative electrode active material can be suppressed. Therefore, a combination of the LMO composite oxide with the negative electrode active material having a uniform shape (more preferably with an electrolyte containing a sulfonic acid-based compound) largely suppresses local deterioration of the negative electrode active material, and causes a charge-discharge reaction on a surface of the negative electrode active material more efficiently. This case is excellent in that high capacity characteristics of the LMO composite oxide can be exhibited effectively and the capacity retention ratio of a battery can be improved as a result. The lithium-transition metal composite oxide containing Mn is not limited to the LMO composite oxide. Examples thereof include a lithium nickel manganese-based oxide ($Li(Ni—Mn)O_2$) and an NMC composite oxide. These active materials can obtain the above effect, for example, can minimize an influence by the eluted Mn similarly to the LMO composite oxide, and can suppress deterioration itself of the surface of the negative electrode active material.

As described above, the NMC composite oxide includes a composite oxide in which part of transition metal elements are replaced with other metal element. In that case, examples of other element include Ti, Zr, Nb, W, P, Al, Mg, V, Ca, Sr, Cr, Fe, B, Ga, In, Si, Mo, Y, Sn, V, Cu, Ag, and Zn. Preferably, it is Ti, Zr, Nb, W, P, Al, Mg, V, Ca, Sr, or Cr. More preferably, it is Ti, Zr, P, Al, Mg, or Cr. From the viewpoint of improving the cycle characteristics, it is even more preferably Ti, Zr, Al, Mg, or Cr.

By having high theoretical discharge capacity, the NMC composite oxide preferably has a composition represented by General Formula (1): $Li_aNi_bMn_cCo_dM_xO_2$ (with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$. M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that $0.4 \leq b \leq 0.6$ in General Formula (1). Meanwhile, composition of each element can be measured by induction coupled plasma (ICP) spectroscopy.

In general, from the viewpoint of improving purity and improving electron conductivity of a material, nickel (Ni), cobalt (Co) and manganese (Mn) are known to contribute to capacity and output characteristics. Ti or the like replaces part of transition metal in a crystal lattice. From the viewpoint of the cycle characteristics, it is preferable that part of transition element are replaced by other metal element, and it is preferable that $0 < x \leq 0.3$ in General Formula (1), in particular. By dissolving at least one selected from the group consisting of Ti, Zr, Nb, W, P, Al, Mg, V, Ca, Sr and Cr, the crystal structure is stabilized so that a decrease in capacity of a battery is prevented even after repeated charge and discharge, and thus, it is believed that excellent cycle characteristics can be achieved.

As a more preferred embodiment, b, c, and d in General Formula (1) satisfy $0.44 \leq b \leq 0.51$, $0.27 \leq c \leq 0.31$, and $0.19 \leq d \leq 0.26$ from the viewpoint of having excellent balance between capacity and durability.

The NMC composite oxide can be prepared by selecting various known methods such as a co-precipitation method and a spray drying method. The co-precipitation method is preferably used due to easy preparation of a composite oxide. Specifically, for example, a nickel cobalt manganese composite hydroxide is manufactured by the co-precipitation method as a method described in JP 2011-105588 A. Thereafter, the nickel cobalt manganese composite hydroxide and a lithium compound are mixed and fired to obtain an NMC composite oxide.

Of course, a positive electrode active material other than the above materials may be used.

(a) Average Particle Diameter of Positive Electrode Active Material

The average particle diameter of the positive electrode active material contained in the positive electrode active material layer is not particularly limited, but is preferably 1 to 100 µm, and more preferably 1 to 25 µm from a viewpoint of high output.

(b) Content of Positive Electrode Active Material

In the positive electrode active material layer, the content of the positive electrode active material is preferably 80 to 99.5% by weight, and more preferably 85 to 99.5% by weight.

(Binder)

The binder (binding agent) used in the positive electrode active material layer or the negative electrode active material layer is not particularly limited as long as the binder can bind an active material, for example, can bind active material particles to each other, can bind a conductive aid to an active material particle, or can bind an active material on a current collector.

(a) Material (Kind) of Binder

The binder used in the positive electrode active material layer or the negative electrode active material layer is not particularly limited as long as the binder is made of a material having the above binding ability. The following materials can be mentioned; thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and a hydrogenated product thereof, and a styrene-isoprene-styrene block copolymer and a hydrogenated product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TEF-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFT-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene fluorine-based fluorine rubber (VDF-CTFE-based fluorine rubber), an epoxy resin, and the like. These binders may be each used singly, or two or more thereof may be used in combination. Among these compounds, polyvinylidene fluoride, polyimide, styrene-butadiene rubber, carboxymethyl cellulose, polypropylene, polytetrafluoroethylene, polyacrylonitrile, and polyamide are more preferable. These preferable binders have excellent heat resistance, have a very wide potential window, are stable on both a positive electrode potential and a negative electrode potential, and can be used in an electrode (positive electrode and negative electrode) active material layer. However, the binder used in the electrode active material layer is not limited to these materials, but a known material conventionally used as a binder for a lithium ion secondary battery can be used. These binders can be also referred to as organic solvent-based binders because an organic solvent is used as a solvent or a dispersion medium.

(b) Water-based Binder

A water-based binder may be used in the negative electrode active material layer. The water-based binder has a high binding force, water as a raw material is easily available, and water vapor is generated at the time of drying. Therefore, capital investment in a manufacturing line can be suppressed significantly, and an environmental burden can be reduced advantageously.

The water-based binder means a binder using water as a solvent or a dispersion medium. Specifically, a thermoplastic resin, a polymer having rubber elasticity, a water-soluble polymer, or the like, or a mixture thereof corresponds to the water-based binder. Here, the binder using water as a dispersion medium includes all the materials expressed by a latex or an emulsion, and means a polymer emulsified with or suspended in water. Examples thereof include a polymer latex emulsion-polymerized in a system to be self-emulsified.

Specific examples of the water-based binder include a water-soluble polymer such as a styrene-based polymer (styrene-butadiene rubber, a styrene-vinyl acetate copolymer, a styrene-acrylic copolymer, or the like), acrylonitrile-butadiene rubber, methyl methacrylate-butadiene rubber, a (meth)acrylic polymer (polyethyl acrylate, polyethyl methacrylate, polypropyl acrylate, polymethyl methacrylate (methyl methacrylate rubber), polypropyl methacrylate, polyisopropyl acrylate, polyisopropyl methacrylate, polybutyl acrylate, polybutyl methacrylate, polyhexyl acrylate, polyhexyl methacrylate, polyethylhexyl acrylate, polyethylhexyl methacrylate, polylauryl acrylate, polylauryl methacrylate, or the like), polytetrafluoroethylene, polyethylene, polypropylene, an ethylene-propylene copolymer, polybutadiene, butyl rubber, fluorine rubber, polyethylene oxide, polyepichlorohydrin, polyphosphazene, polyacrylonitrile, polystyrene, an ethylene-propylene-diene copolymer, polyvinyl pyridine, chlorosulfonated polyethylene, a polyester resin, a phenol resin, an epoxy resin; polyvinyl alcohol (average polymerization degree: preferably 200 to 4000, more preferably 1000 to 3000, saponification degree: preferably 80 mol % or more, more preferably 90 mol % or more) and a modified product thereof (a 1 to 80 mol % saponified product of a vinyl acetate unit of a copolymer having a molar ratio of ethylene/vinyl acetate=2/98 to 30/70, 1 to 50 mol % partial acetalization product of polyvinyl alcohol, or the like), starch and a modified product thereof (oxidized starch, phosphoric acid esterified starch, cationic starch, or the like), a cellulose derivative (carboxymethyl cellulose, methyl cellulose, hydroxypropyl cellulose, hydroxyethyl cellulose, and salts thereof, or the like), polyvinyl pyrrolidone, polyacrylic acid (salt), polyethylene glycol, a copolymer of (meth)acrylamide and/or (meth)acrylate [a (meth)acrylamide polymer, a (meth)acrylamide-(meth)acrylate copolymer, a (meth)acrylic acid alkyl (1-4 carbon atoms) ester-(meth)acrylate copolymer, or the like], a styrene-maleate copolymer, a Mannich modified product of polyacrylamide, a formalin condensation resin (a urea-formalin resin, a melamine-formalin resin, or the like), polyamide polyamine or a dialkyl amine-epichlorohydrin copolymer, polyethylene imine, casein, a soybean protein, a synthetic protein, and a mannan galactan derivative. These water-based binders may be used singly or in combination of two or more kinds thereof. A material partially overlapping the above organic solvent-based binder can be used in both an organic solvent and water.

The above water-based binder preferably contains at least one rubber-based binder selected from the group consisting of styrene-butadiene rubber, acrylonitrile-butadiene rubber, methyl methacrylate-butadiene rubber, and methyl methacrylate rubber from a viewpoint of a binding property. Furthermore, the water-based binder preferably contains styrene-butadiene rubber because of an excellent binding property.

When styrene-butadiene rubber is used as the water-based binder, the above water-soluble polymer is preferably used together from a viewpoint of improving a coating property. Examples of a water-soluble polymer preferably used together with styrene-butadiene rubber include polyvinyl alcohol and a modified product thereof, starch and a modified product thereof, a cellulose derivative (carboxymethyl cellulose, methyl cellulose, hydroxyethyl cellulose, and salts thereof), polyvinyl pyrrolidone, polyacrylic acid (salt), and polyethylene glycol. Among these compounds, styrene-butadiene rubber is preferably combined with carboxymethyl cellulose (salt) as the water-based binder. A content weight ratio between styrene-butadiene rubber and a water-soluble polymer is not particularly limited, but the ratio of styrene-butadiene rubber:water-soluble polymer is preferably 1:0.1 to 10, and more preferably 1:0.5 to 2.

When the water-based binder is used in the negative electrode active material layer, among binders used in the negative electrode active material layer, the content of the water-based binder is preferably 80 to 100% by mass, preferably 90 to 100% by mass, and preferably 100% by mass.

(c) Content of Binder

The content of the binder contained in the positive electrode active material layer or the negative electrode active material layer depends on the kind of the binder, but is not particularly limited as long as the content can bind the active material. The content is preferably 0.5 to 15% by mass, and more preferably 1 to 10% by mass with respect to the total amount of the positive electrode active material layer or the negative electrode active material layer.

(Conductive Aid)

The conductive aid is blended in order to improve conductivity of the positive electrode active material layer or the negative electrode active material layer. Examples of the conductive aid include carbon black such as Ketjen black and acetylene black, graphite, carbon fiber, or vapor-grown carbon fiber. When the positive electrode active material layer or the negative electrode active material layer contains a conductive aid, an electron network inside the positive electrode active material layer or the negative electrode active material layer is formed effectively to be able to contribute to improvement of output characteristics of a battery. The conductive aid is not limited to these materials, but a conventionally known material used as a conductive aid for a lithium ion secondary battery can be used. These conductive aids may be used singly or in combination of two or more kinds thereof. However, when the negative electrode active material layer uses a carbon material having excellent conductivity for the negative electrode active material and an electron network inside the negative electrode active material layer is formed effectively without using a conductive aid to be able to contribute to improvement of output characteristics of a battery, it is not necessary to use the conductive aid.

The content of the conductive aid in the positive electrode active material layer is 1% by mass or more, more preferably 3% by mass or more, and still more preferably 5% by mass or more with respect to the total amount of the positive electrode active material layer. The content of the conductive aid in the positive electrode active material layer is 15% by mass or less, more preferably 10% by mass or less, and still more preferably 7% by mass or less with respect to the total amount of the positive electrode active material layer. By specifying a blending ratio (content) of the conductive aid in the positive electrode active material layer having low electron conductivity of the active material itself and capable of reducing electrode resistance according to the amount of the conductive aid, the following effect is exhibited. That is, the effect of the present embodiment can be exhibited without inhibiting an electrode reaction. In addition, it is possible to sufficiently ensure the electron conductivity, to suppress reduction in an energy density due to reduction in an electrode density, and to improve the energy density due to improvement of the electrode density.

The content of the conductive aid in the negative electrode active material layer depends on the negative electrode active material, and therefore cannot be specified uniquely. That is, when a negative electrode active material itself has excellent electron conductivity, that is, when a carbon material such as graphite (black lead), soft carbon, and hard carbon, or a metal material is used as the negative electrode active material, the negative electrode active material layer does not particularly need to contain a conductive aid. Even when the negative electrode active material layer contains a conductive aid, it is sufficient that the content thereof is at most 0.1 to 1% by mass with respect to the total amount of the negative electrode active material layer. Meanwhile, similarly to the positive electrode active material, when a negative electrode active material such as a lithium alloy-based negative electrode material having a low electron conductivity and capable of reducing electrode resistance according to the amount of a conductive aid and a lithium-transition metal composite oxide (for example, $Li_4Ti_5O_{12}$) is used, the content of the conductive aid is preferably about the same as the content of the conductive aid in the positive electrode active material layer. That is, the content of the conductive aid in the negative electrode active material layer is preferably 1 to 10% by mass, more preferably 2 to 8% by mass, and particularly preferably 3 to 7% by mass with respect to the total amount of the negative electrode active material layer.

Moreover, a conductive binder having functions of the conductive aid and the binder (binding agent) may be used in place of the conductive aid and the binder (binding agent), or may be used together with one or both of the conductive aid and the binder (binding agent). Examples of the conductive binder include a commercially available TAB-2 (manufactured by Hosen Corporation). The content of the conductive binder is only required to be within (the above content of a binder+the above content of a conductive aid).

(Electrolyte Salt (Lithium Salt))

Examples of the electrolyte salt (lithium salt) contained in the positive electrode active material layer or the negative electrode active material layer include an inorganic acid anion salt such as $LiPF_6$, $LiBF_4$, $LiClO_4$, $LiAsF_6$, $LiTaF_6$, $LiSbF_6$, $LiAlCl_4$, $Li_2B_{10}Cl_{10}$, LiI, LiBr, LiCl, LiAlCl, $LiHF_2$, and LiSCN, and an organic acid anion salt such as $LiCF_3SO_3$, $Li(CF_3SO_2)_2N$, LiBOB (lithium bis oxide borate), and LiBETI (lithium bis (perfluoroethylene sulfonylimide); also written as $Li(C_2F_5SO_2)_2N$). These electrolyte salts may be used singly or in a form of a mixture of two or more kinds thereof.

(Ion Conductive Polymer)

Examples of the ion conductive polymer contained in the positive electrode active material layer or the negative electrode active material layer include a polymer with polyethylene oxide (PEO) in a main chain or a side chain (polyethylene oxide (PEO)-based polymer), a polymer with polypropylene oxide (PPO) in a main chain or a side chain (polypropylene oxide (PPO)-based polymer), polyethylene glycol (PEG), polyacrylonitrile (PAN), polymethacrylate, polyvinylidene fluoride (PVdF), a copolymer of polyvinylidene fluoride and hexafluoropropylene (PVdF-HFP), polyacrylonitrile (PAN), poly(methyl acrylate) (PMA), and poly(methyl methacrylate) (PMMA). A mixture of the above polymers or the like, a modified product, a derivative, a random copolymer, an alternating copolymer, a graft copolymer, a block copolymer, or the like can be used. Among these compounds, it is desirable to use PEO, PPO, and a copolymer thereof, PVdF, or PVdF-HFP. An electrolyte salt such as a lithium salt can be dissolved well in such a matrix polymer.

A blending ratio of the components contained in the positive electrode active material layer or the negative electrode active material layer is not particularly limited. The blending ratio can be adjusted by appropriately referring to known knowledge of a lithium ion secondary battery. The weight per unit area of the positive electrode active material layer or the negative electrode active material layer is preferably 20 to 30 $mg/cm^2$, and the density is preferably 2.5 $g/cm^3$ to 3.5 $g/cm^3$. The charge-discharge capacity and the output characteristics are usually in a trade-off relationship by a design value of the weight per unit area of the positive electrode active material layer or the negative electrode active material layer. However, by setting the weight per unit area within the above range, a performance balance between the charge-discharge capacity and the output characteristics can be optimized (both can be obtained). Increase in the density of the positive electrode active material layer or the negative electrode active material layer allows the charge-discharge capacity per unit volume to increase. However, excessive pressing causes crushing of the active material, and therefore the density is preferably within the above range. The density within the above range is excellent in terms of being able to increase the charge-discharge capacity without causing reduction in the capacity due to crushing of the active material.

The thickness of the positive electrode active material layer or the negative electrode active material layer is not particularly limited, but conventionally known knowledge of a battery can be appropriately referred to. For example, the thickness of the positive electrode active material layer or the negative electrode active material layer is about 2 to 100 µm.

[Electrolyte Layer]

The electrolyte layer has a function of maintaining an electrolyte to ensure lithium ion conductivity between the positive electrode and the negative electrode and a function of a partition wall between the positive electrode and the negative electrode. Examples of the electrolyte layer include a layer obtained by forming a layer structure using a liquid electrolyte (electrolytic solution), or gel polymer electrolyte held by a separator, or a solid polymer electrolyte, and furthermore a layer obtained by forming a laminated structure using a gel polymer electrolyte or a solid polymer electrolyte.

(Separator)

Examples of a form of the separator include a porous sheet separator or a non-woven fabric separator formed of a polymer or a fiber which absorbs and holds the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which plural of them are laminated (for example, a laminate with three-layer structure of PP/PE/PP), and a hydrocarbon based resin such as polyimide, aramid, or polyfluorovinylydene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 µm as a monolayer or a multilayer. Fine pore diameter of the microporous (microporous membrane) separator is preferably 1 µm or less at most (in general, the pore diameter is about several tens of nanometer).

As a non-woven separator, conventionally known ones such as cotton, rayon, acetate, nylon, polyester; polyolefin such as PP and PE; polyimide and aramid are used either singly or as a mixture. Furthermore, the volume density of a non-woven fabric is not particularly limited as long as sufficient battery characteristics are obtained with an impregnated polymer gel electrolyte.

As the separator, a separator obtained by laminating a heat-resistant insulating layer on a porous substrate (separator with a heat-resistant insulating layer) may be used. The heat-resistant insulating layer is a ceramic layer containing an inorganic particle and a binder. As the separator with a heat-resistant insulating layer, a separator having a melting point or thermal softening point of 150° C. or higher, preferably 200° C. or higher is used. Presence of the heat-resistant insulating layer relaxes an internal stress of the separator to increase with rise in the temperature, and therefore a heat shrinkage-suppressing effect can be obtained. As a result, induction of a short circuit between the electrodes of a battery can be prevented, and therefore the battery hardly lowers performance due to rise in the temperature. In addition, the presence of the heat-resistant insulating layer improves a mechanical strength of the separator with a heat-resistant insulating layer, and hardly breaks a film of the separator. Furthermore, the separator is hardly curled in a process for manufacturing a battery due to the heat shrinkage-suppressing effect and the high mechanical strength.

The inorganic particle in the heat-resistant insulating layer contributes to the mechanical strength of the heat-resistant insulating layer and the heat shrinkage-suppressing effect. A material used as the inorganic particle is not particularly limited. Examples thereof include oxide, hydroxide and nitride of silicon, aluminum, zirconium, and titanium ($SiO_2$, $Al_2O_3$, $ZrO_2$, and $TiO_2$), and complexes thereof. These inorganic particles may be derived from mineral resources such as boehmite, zeolite, apatite, kaoline, mullite, spinel, olivine, or mica, and may be artificially manufactured. These inorganic particles may be used singly or in combination of two or more kinds thereof. Among these inorganic particles, silica (SiO$_2$) or alumina (Al$_2$O$_3$) is preferably used, and alumina (Al$_2$O$_3$) is more preferably used from a viewpoint of cost.

The weight per unit area of a heat-resistant particle is not particularly limited, but is preferably 5 to 15 g/m$^2$. The weight per unit area within this range is preferable in terms of obtaining sufficient ion conductivity and maintaining heat-resistant strength.

The binder in the heat-resistant insulating layer has a role to bind inorganic particles to each other, or bind the inorganic particles to a resin porous substrate layer. The binder forms the heat-resistant insulating layer stably, and prevents peeling between the porous substrate layer and the heat-resistant insulating layer.

The binder used in the heat-resistant insulating layer is not particularly limited. Examples thereof include a compound such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), or methyl acrylate. Among these compounds, carboxymethyl cellulose (CMC), methyl acrylate, and polyvinylidene fluoride (PVDF) is preferably used. These compounds may be used singly or in combination of two or more kinds thereof.

The content of the binder in the heat-resistant insulating layer is preferably 2 to 20% by weight with respect to 100% by weight of the heat-resistant insulating layer. When the content of the binder is 2% by weight or more, the peeling strength between the heat-resistant insulating layer and the porous substrate layer can be enhanced, and vibration resistance of the separator can be improved. On the other hand, when the content of the binder is 20% by weight or less, a gap between the inorganic particles can be maintained properly, and therefore sufficient lithium ion conductivity can be secured.

The heat shrinkage of the separator with a heat-resistant insulating layer is preferably 10% or less in MD and TD after the separator is held under conditions of 150° C. and 2 gf/cm$^2$ for one hour. By using such a highly heat-resistant material, the heat generation amount in the positive electrode is increased, and shrinkage of the separator can be prevented effectively even when the temperature in a battery reaches 150° C. As a result, induction of a short circuit between the electrodes of a battery can be prevented, and therefore the battery is configured to hardly lower performance due to rise in the temperature.

As described above, the electrolyte layer contains an electrolyte. The electrolyte is not particularly limited as long as the electrolyte can exhibit a function of securing lithium ion conductivity between the positive electrode and the negative electrode. However, a liquid electrolyte, a gel polymer electrolyte, or a solid polymer electrolyte is used. Use of the gel polymer electrolyte or the solid polymer electrolyte stabilizes a distance between the electrodes, suppresses generation of polarization, and improves durability (cycle characteristics).

The liquid electrolyte has a function as a carrier of a lithium ion. The liquid electrolyte forming an electrolytic solution layer has a form in which a lithium salt as a support salt is dissolved in an organic solvent as a plasticizer. Examples of the organic solvent used include carbonates such as ethylene carbonate (EC), propylene carbonate (PC), butylene carbonate (BC), dimethyl carbonate (DMC), diethyl carbonate (DEC), dipropyl carbonate (DPC), and ethyl methyl carbonate (EMC); methyl propionate (MP), methyl acetate (MA), methyl formate (MF), 4-methyl dioxolane (4MeDOL), dioxolane (DOL), 2-methyltetrahydrofuran (2MeTHF), tetrahydrofuran (THF), dimethoxyethane (DME), and γ-butyrolactone (GBL). These solvents may be used singly or in a form of a mixture of two or more kinds thereof. The support salt (lithium salt) is not particularly limited. However, a lithium salt which can be added to the active material layer of the electrode can be used similarly. Examples of the lithium salt include an inorganic acid anion salt such as LiPF$_6$, LiBF$_4$, LiClO$_4$, LiAsF$_6$, LiTaF$_6$, LiSbF$_6$, LiAlCl$_4$, Li$_2$B$_{10}$Cl$_{10}$, LiI, LiBr, LiCl, LiAlCl, LiHF$_2$, and LiSCN, and an organic acid anion salt such as LiCF$_3$SO$_3$, Li(CF$_3$SO$_2$)$_2$N, LiBOB (lithium bis oxide borate), and LiBETI (lithium bis (perfluoroethylene sulfonylimide); also written as Li(C$_2$F$_5$SO$_2$)$_2$N). These support salts (lithium salts) may be used singly or in a form of a mixture of two or more kinds thereof. The liquid electrolyte may further contain an additive in addition to the components that are described above. Specific examples of the compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methyleneethylene carbonate. Among them, vinylene carbonate, methylvinylene carbonate, and vinylethylene carbonate are preferable. Vinylene carbonate and vinylethylene carbonate are more preferable. Those cyclic carbonate esters may be used either singly or in combination of two or more types.

The gel polymer electrolyte has a constitution that the aforementioned liquid electrolyte is injected to a matrix polymer (host polymer) consisting of an ion conductive polymer. Using a gel polymer electrolyte as an electrolyte is excellent in that the fluidity of an electrolyte disappears and ion conductivity between each layer is blocked. Examples of the ion conductive polymer used as a matrix polymer (host polymer) include a polymer with polyethylene oxide in a main chain or a side chain (PEO), a polymer with polypropylene oxide in a main chain or a side chain (PPO), polyethylene glycol (PEG), polyacrylonitrile (PAN), polymethacrylate, polyvinylidene fluoride (PVdF), a copolymer of polyvinylidene fluoride and hexafluoropropylene (PVdF-HFP), polyacrylonitrile (PAN), poly(methyl acrylate) (PMA), and poly(methyl methacrylate) (PMMA). A mixture, a modified product, a derivative, a random copolymer, an alternating copolymer, a graft copolymer, a block copolymer, or the like, of the above polymers or the like can be used. Among these compounds, it is desirable to use PEO, PPO, and a copolymer thereof, PVdF, or PVdF-HFP. An electrolyte salt such as a lithium salt can be dissolved well in such a matrix polymer.

The solid polymer electrolyte has a structure in which the lithium salt is dissolved in the matrix polymer (host polymer) formed of an ion conductive polymer, and a structure containing no organic solvent as a plasticizer can be exemplified. Therefore, when the electrolyte layer is formed of the solid polymer electrolyte, there is no risk of liquid leakage from a battery, and reliability of the battery can be improved.

As the ion conductive polymer used as the matrix polymer (host polymer), a polymer similar to the matrix polymer formed of an ion conductive polymer used in the gel polymer electrolyte can be used.

The matrix polymer of the gel electrolyte or the solid polymer electrolyte can exhibit excellent mechanical strength by forming a crosslinked structure. In order to form the crosslinked structure, using an appropriate polymerization initiator, a polymerizable polymer for forming a polymer electrolyte (for example, PEO or PPO) is only required to be subjected to a polymerization treatment such as thermal polymerization, ultraviolet polymerization, radiation polymerization, and electron beam polymerization.

(Additive in Electrolyte; Sulfonic Acid-Based Compound)

Furthermore, in the present embodiment, an electrolyte containing a sulfonic acid-based compound (additive) in a composition is desirably used. When the electrolyte contains a sulfonic acid-based compound (additive), a firmer coating can be generated on a surface of the negative electrode active material (particle) due to the sulfonic acid-based compound during charging and discharging. In this case, in a conventional negative electrode active material having a nonuniform shape (complex protrusion shape on a particle surface), it is difficult to form a firm coating having a uniform thickness on an entire surface of the negative electrode active material particle due to the sulfonic acid-based compound, and there is a region in which the coating is hardly formed around a complex protrusion shape. Therefore, in the region in which the coating is hardly formed, particularly in the protrusion and therearound, deterioration occurs locally by a local reaction due to an electrolytic solution as in the related art. Meanwhile, by satisfying the tap density or the like within a specific range of the present embodiment, a firmer coating having a substantially uniform thickness can be formed on an entire surface of negative electrode active material particles in the negative electrode active material having a uniform shape. Therefore, the coating can prevent a local reaction due to an electrolytic solution, and therefore deterioration itself on a surface of the negative electrode active material (particle) can be suppressed. Therefore, lowering (deterioration) of battery performance can be suppressed. In addition, the capacity retention ratio of a battery can be improved.

As the above sulfonic acid-based compound, a disulfonate capable of forming a compact and dense (firm) coating and improving durability of a battery (with a noble reduction potential), represented by formula (1) below, can be used.

[Chemical formula 1]

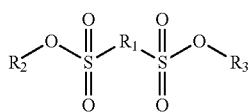

(1)

In formula (1), $R_1$ represents a substituted or unsubstituted alkylene group having 1 to 3 carbon atoms or a substituted or unsubstituted polyfluoroalkylene group having 1 to 3 carbon atoms, $R_2$ and $R_3$ each independently represent a substituted or unsubstituted alkyl group having 1 to 4 carbon atoms or a substituted or unsubstituted polyfluoroalkyl group having 1 to 4 carbon atoms, $R_2$ and $R_3$ may be bonded to each other to form a ring, and $R_2$ may be a corresponding alkylene group and $R_3$ may be a single bond when $R_2$ and $R_3$ form a ring.

Examples of the alkylene group in $R_1$ include a methylene group, an ethylene group, and a propylene group. A methylene group is preferable. Examples of the polyfluoroalkylene group in $R_1$ include a group obtained by substituting one or more hydrogen atoms in an alkylene group with one or more fluorine atoms. Specific examples thereof include —CHF—, —CH$_2$CF$_2$—, —CF$_2$CH$_2$CF$_2$—, —CH(CF$_3$)CF$_2$—, and —CH$_2$CF(CF$_3$)—.

Examples of a substituent optionally present in $R_1$ include an alkyl group having 1 to 3 carbon atoms (a methyl group, an ethyl group, an n-propyl group, an isopropyl group), a fluorine-substituted alkyl group having 1 to 3 carbon atoms, a vinyl group, and a fluorine atom.

Examples of the alkyl group having 1 to 4 carbon atoms in $R_2$ and $R_3$ include a methyl group, an ethyl group, an n-propyl group, an isopropyl group, an n-butyl group, an isobutyl group, a sec-butyl group, and a tert-butyl group. Examples of the polyfluoroalkyl group in $R_2$ and $R_3$ include a group obtained by substituting one or more hydrogen atoms in the alkyl group with one or more fluorine atoms. Specific examples thereof include a 2,2-difluoro-n-propyl group.

Examples of a substituent optionally present in $R_2$ and $R_3$ include a vinyl group and a carbonyl group.

Examples of a compound represented by formula (1) above include compounds (1) to (15) shown in Tables 1 and 2 below.

TABLE 1

| compound (1) | 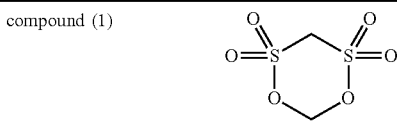 |
|---|---|
| compound (2) | 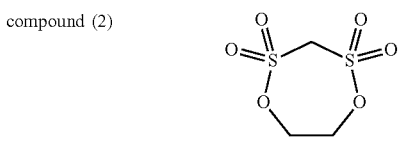 |
| compound (3) | 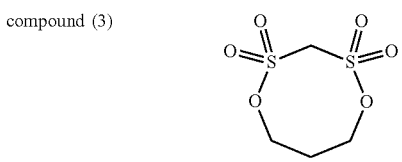 |
| compound (4) | 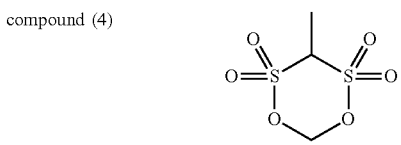 |
| compound (5) | 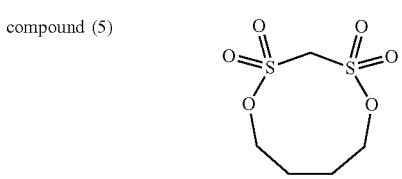 |

TABLE 1-continued

| | |
|---|---|
| compound (6) | 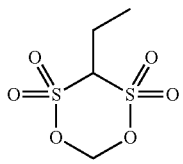 |
| compound (7) | 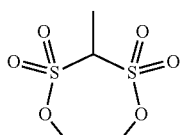 |
| compound (8) | 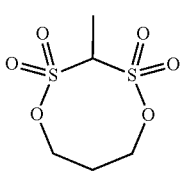 |
| compound (9) | 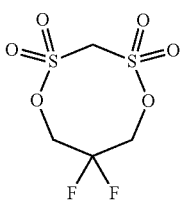 [SMILES: O=S1(=O)CS(=O)(=O)OCC(F)(F)CO1] |

TABLE 2

| | |
|---|---|
| compound (10) | 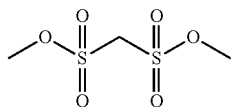 |
| compound (11) | 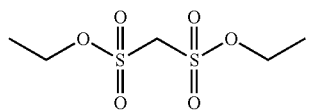 |
| compound (12) | 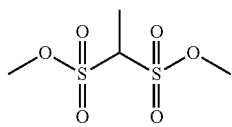 |
| compound (13) | 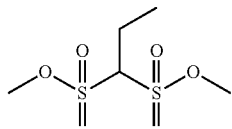 |
| compound (14) | 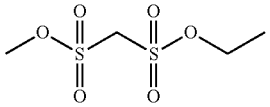 |
| compound (15) | 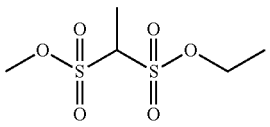 |

Among the compounds represented by formula (1) above, methylene methane disulfonate (compound (1)), ethylene methane disulfonate (compound (2)), propylene methane disulfonate (compound (3)), dimethyl methane disulfonate (compound (10)), diethyl methane disulfonate (compound (11)), and ethylmethyl methane disulfonate (compound (14)) are exemplified from a viewpoint of formation of a coating.

The sulfonic acid-based compounds may be used singly or in combination of two or more kinds thereof. In a case of use in combination of two or more kinds, a disulfonate compound additive represented by formula (1) with a noble reduction potential is decomposed in a first charging step.

The concentration of the sulfonic acid-based compound (additive) in an electrolyte is not particularly limited, but is preferably 0.5 to 3.5% by mass, and more preferably 1 to 3% by mass with respect to 100% by mass of the electrolyte. By making the concentration of the sulfonic acid-based compound (additive) 0.5% by mass or more, a firm coating can be formed sufficiently on a surface of an electrode. Meanwhile, by making the concentration 3.5% by mass or less, increase in initial resistance due to formation of a coating is suppressed, and the tap density or the like within a specific range of the present embodiment is satisfied. A uniform and firmer coating can be thereby formed on a particle surface of the negative electrode active material having a uniform shape. Therefore, the coating can prevent a local reaction due to an electrolytic solution, and therefore deterioration itself on a surface of the negative electrode active material (particle) can be suppressed. Therefore, lowering (deterioration) of battery performance can be suppressed. In addition, the capacity retention ratio of a battery can be improved.

In addition, as the above sulfonic acid-based compound, a disulfonate compound represented by general formula (2) or (3) below can be used.

[Chemical formula 2]

$$X_1-R_1-X_2 \quad (2)$$

$$X_3-R_2-X_4-R_3-X_5 \quad (3)$$

However, in general formulae (2) and (3) above, $X_1$ to $X_5$ may be the same as or different from one another, and are each independently a disulfonate compound represented by general formula (4) below. $R_1$ to $R_3$ may be the same as or different from one another, and are each independently a single bond or a substituted or unsubstituted alkylene group having 1 to 5 carbon atoms.

[Chemical formula 3]

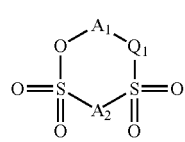

(4)

However, in general formula (4) above, $A_1$ and $A_2$ are each independently a substituted or unsubstituted alkylene group having 1 to 5 carbon atoms. A bonding site to $R_1$ to $R_3$ is $A_1$ or $A_2$. $Q_1$ is each independently an oxygen atom, a methylene group, or a single bond.

In general formula (2) or (3), typical examples of substituent of a substituted or unsubstituted optionally branched alkylene group having 1 to 5 carbon atoms include a methylene group, an ethylene group, an n-propylene group, an n-butylene group, a 2-methylpropylene group, a 1-chloroethylene group, and a 1-fluoro-3-chlorobutylene group. However, more preferable examples thereof include a methylene group and an ethylene group. This can suppress increase in viscosity of a non-aqueous electrolytic solution and increase in resistance in accordance therewith.

In the above sulfonic acid-based compound, for example, by causing a polymerization reaction with an electrochemical reaction during charging and discharging of a battery by multimerizing a disulfonate compound, the tap density or the like within a specific range of the present embodiment is satisfied. A more stable and firmer coating is thereby formed on a particle surface of the negative electrode active material having a uniform shape. Therefore, the coating can prevent a local reaction due to an electrolytic solution, and therefore deterioration itself on a surface of the negative electrode active material (particle) can be suppressed. Therefore, lowering (deterioration) of battery performance can be suppressed. In addition, the capacity retention ratio of a battery can be improved. This case is excellent in that the more stable and firmer coating can suppress a decomposition reaction of an electrolytic solution or a support salt and can suppress lowering of battery characteristics in cycle characteristics or storage characteristics. It is considered that a process in which a firm coating is generated by a reaction between the disulfonate compound (additive) and a surface of the negative electrode is according to the following reaction formula.

[Chemical formula 4]

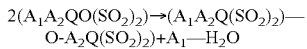

In the above formula, "$2(A_1A_2QO(SO_2)_2)$" is a representation in a simplified form of a cyclic compound having a $X_1$-$X_2$ structure in which $X_1$ and $X_2$ in general formula (2) above are bonded to each other by a single bond (=structure in which disulfonate compounds in general formula (4) are bonded to each other by a single bond). Therefore, $A_1$, $A_2$, and Q have been described in general formula (4). In the process in which a firm coating is generated by a reaction between the additive and a surface of the negative electrode, it is considered that the above cyclic compound ($2(A_1A_2QO(SO_2)_2)$) is opened around the O (oxygen) to be bonded to a particle surface of the negative electrode active material (carbon atom of a carbon material such as graphite). It is considered that a reaction is performed in a similar manner to the above reaction formula also in general formula (1) above.

The disulfonate compounds represented by general formula (2) or (3) above will be specifically exemplified in Table 3 below as compound numbers 1 to 9. However, the present embodiment is not limited to these examples.

TABLE 3

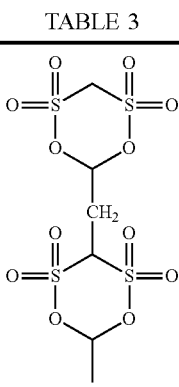

TABLE 3-continued

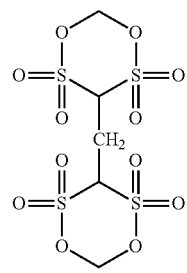 [SMILES: O=S1(=O)OCOS(=O)(=O)C1CC1S(=O)(=O)OCOS1(=O)=O]

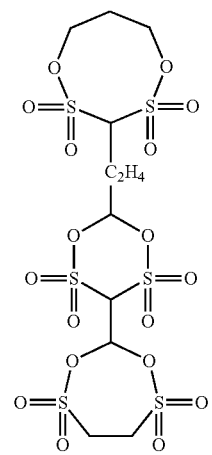

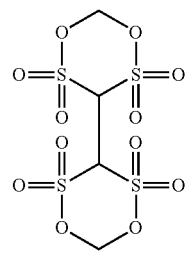 [SMILES: O=S1(=O)OCOS(=O)(=O)C1C1S(=O)(=O)OCOS1(=O)=O]

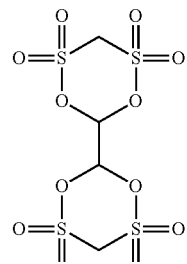

TABLE 3-continued

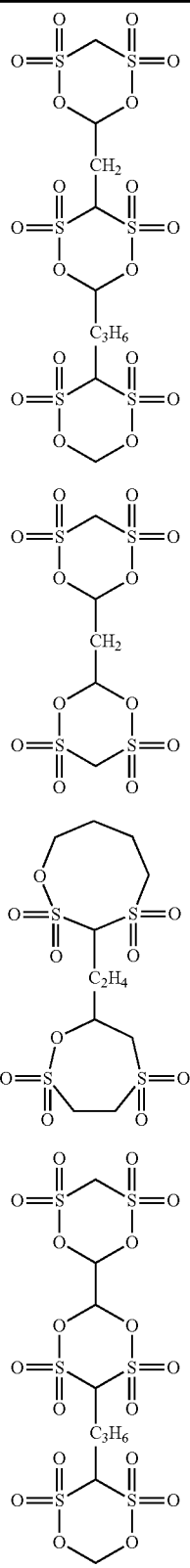

For example, the disulfonate compounds represented by general formula (2) or (3) above can be obtained by using a manufacturing method described in JP H5-44946 A or U.S. Pat. No. 4,950,768. For example, compound number 2 in Table 3 (hereinafter, also referred to as compound No. 2) can be synthesized by a reaction between $(SO_2Cl)_2CHCH_2CH(SO_2Cl)_2$ and silver carbonate and a subsequent reaction between the resulting product and X—$CH_2$—X (X=Cl or I).

A ratio (content) of the disulfonate compounds represented by general formula (2) or (3) with respect to a liquid electrolyte (non-aqueous electrolytic solution) is not particularly limited, but is preferably 0.005 to 10% by mass with respect to the total amount of the electrolyte. By making the concentration (content) of the disulfonate compounds (additive) represented by general formula (2) or (3) 0.005% by mass or more, the amount of a coating is sufficient due to the additive, and a stable and firm coating effect can be obtained sufficiently. The concentration (content) is more preferably 0.01% by mass or more. This can further improve battery characteristics. By making the concentration (content) 10% by mass or less, a coating does not become excessive when a liquid electrolyte (non-aqueous electrolytic solution) as an electrolyte or a gel polymer electrolyte is used. Therefore, increase in a bulk portion not contributing to a reaction can be prevented, and increase in internal resistance can be prevented. In addition, this can suppress increase in viscosity of an electrolyte containing an additive and increase in resistance in accordance therewith. The concentration (content) is more preferably 5% by mass or less. This can further improve battery characteristics.

The electrolyte can be a constituent further containing one or more kinds of compounds having a sulfonyl group in addition to the disulfonate compounds represented by general formula (2) or (3) above. For example, the electrolyte may contain a compound represented by general formula (5) below.

[Chemical formula 5]

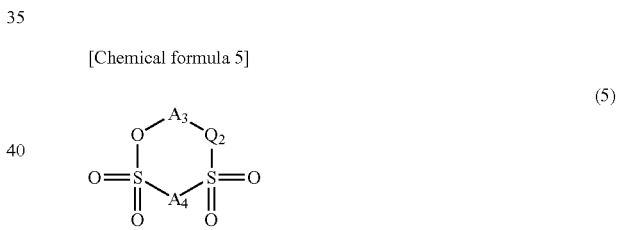

(5)

However, in general formula (5) above, $Q_2$ represents an oxygen atom, a methylene group, or a single bond, and $A_3$ represents a group selected from a substituted or unsubstituted alkylene group having 1 to 5 carbon atoms, a carbonyl group, a sulfinyl group, a polyfluoroalkylene group having 1 to 5 carbon atoms, a substituted or unsubstituted fluoroalkylene group having 1 to 5 carbon atoms, a substituted or unsubstituted alkylene group having 1 to 5 carbon atoms, in which at least one of the C—C bonds is a C—O—C bound, a polyfluoroalkylene group having 1 to 5 carbon atoms, in which at least one of the C—C bonds is a C—O—C bound, and a substituted or unsubstituted fluoroalkylene group having 1 to 5 carbon atoms, in which at least one of the C—C bonds is a C—O—C bound. $A_4$ represents a group selected from a substituted or unsubstituted alkylene group having 1 to 5 carbon atoms, a polyfluoroalkylene group having 1 to 6 carbon atoms, and a substituted or unsubstituted fluoroalkylene group having 1 to 5 carbon atoms.

When the electrolyte contains a compound represented by general formula (5) above, the compound represented by general formula (5) above further suppresses decomposition of a solvent molecule. When the positive electrode active material is a thium-transition metal composite oxide containing Mn, particularly an NMC composite oxide, an influence on elution of Mn or the like can be minimized. Therefore, a reaction occurs more efficiently on a surface of the negative electrode active material (particle). Therefore, lowering of battery performance can be suppressed, and cycle characteristics of a non-aqueous electrolyte secondary battery and the capacity retention ratio of a battery can be further improved. In addition, increase in resistance of a non-aqueous electrolyte secondary battery can be suppressed.

In general formula (5) above, the carbon number of $A_3$ indicates the carbon number forming a ring, and does not include the carbon number contained in a side chain. When $A_3$ is a substituted or unsubstituted fluoroalkylene group having 2 to 5 carbon atoms, $A_3$ may contain a methylene unit and a fluoromethylene unit, or may contain only a fluoromethylene unit. When an alkylene unit or a fluoroalkylene unit is bonded through an ether bond, alkylene units may be bonded to each other, fluoroalkylene units may be bonded to each other, or an alkylene unit and a fluoroalkylene unit may be bonded to each other.

Examples of a compound represented by general formula (5) above include a compound described in JP 2004-281368 A, such as ethylene methanedisulfonate and methylene methanedisulfonate.

For example, the sulfonyl group-containing compound can also include a sultone compound represented by general formula (6) below.

[Chemical formula 6]

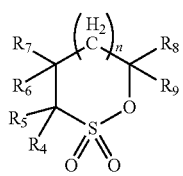

(6)

However, in general formula (6) above, n is an integer of 0 to 2. $R_4$ to $R_9$ represent a group selected from a hydrogen atom, an alkyl group having 1 to 12 carbon atoms, a cycloalkyl group having 3 to 6 carbon atoms, and an aryl group having 6 to 12 carbon atoms.

By adding a sulfonyl group-containing compound represented by general formula (5) or (5) in addition to a disulfonate compound represented by general formula (2) or (3), the viscosity can be adjusted easily when an electrolyte, particularly a non-aqueous electrolytic solution is used. By a synergistic effect due to use of a combination of sulfonyl group-containing compounds, the tap density or the like within a specific range of the present embodiment is also satisfied. Stability of a firm coating on a particle surface of the negative electrode active material having a uniform shape is thereby improved. Moreover, decomposition of a solvent molecule can be suppressed. Furthermore, an effect for removing water in a non-aqueous electrolytic solution is increased.

Specific examples of the sulfonyl group-containing compound include sulfolane, 1,3-propane sultone, 1,4-butane sultone, an alkanesulfonic anhydride, a γ-sultone compound, and a sulfolene derivative. However, the compound is not limited thereto.

When a liquid electrolyte (non-aqueous electrolytic solution) as an electrolyte or a gel polymer electrolyte further contains a sulfonyl compound in addition to general formula (2) or (3) above, the sulfonyl compound can be added, for example, such that the additive amount thereof is 0.005% by mass or more and 10% by mass or less in the non-aqueous electrolytic solution. By making the additive amount 0.005% by mass or more, the tap density or the like within a specific range of the present embodiment is satisfied. A firm coating can be thereby formed effectively on a particle surface of the negative electrode active material having a uniform shape. The additive amount can be more preferably 0.01% by mass or more. By making the additive amount 10% by mass or less, solubility of the sulfonyl compound can be maintained, and increase in viscosity of the non-aqueous electrolytic solution can be suppressed. The additive amount can be more preferably 5% by mass or less.

The liquid electrolyte (non-aqueous electrolytic solution) can be obtained by dissolving or dispersing a compound represented by general formula (2) or (3), and a sulfonyl group-containing compound, a lithium salt, and another additive, if necessary, in an aprotic solvent. By mixing additives having different properties, the tap density or the like within a specific range of the present embodiment is satisfied. A firm coating capable of improving various performance of a battery described above can be thereby formed on a particle surface of the negative electrode active material having a uniform shape. Therefore, battery characteristics are improved effectively. The gel polymer electrolyte can also be obtained by dissolving or dispersing a compound represented by general formula (2) or (3), and a sulfonyl group-containing compound, a lithium salt, and another additive, if necessary, in the liquid electrolyte (non-aqueous electrolytic solution) injected into the matrix polymer.

[Positive Electrode Current Collecting Plate and Negative Electrode Current Collecting Plate]

The material for forming the current collecting plate (25, 27) is not particularly limited, and a known highly conductive material which has been conventionally used for a current collecting plate for a lithium ion secondary battery can be used. Preferred examples of the material for forming a current collecting plate include metal material such as aluminum, copper, titanium, nickel, stainless steel (SUS) and an alloy thereof. From the viewpoint of light weightiness, resistance to corrosion, and high conductivity, aluminum and copper are preferable. Aluminum is particularly preferable. Meanwhile, the same material or a different material can be used for the positive electrode current collecting plate 25 and the negative electrode current collecting plate 27.

[Positive Electrode Lead and Negative Electrode Lead]

Further, although it is not illustrated, the current collector (11, 12) and the current collecting plate (25, 27) can be electrically connected to each other via a positive electrode lead or a negative electrode lead. The same material used for a lithium ion secondary battery of a related art can be also used as a material for forming a positive electrode lead and a negative electrode lead. Meanwhile, a portion led out from a casing is preferably coated with a heat resistant and insulating thermally shrunken tube or the like so that it has no influence on a product (for example, an automobile component, in particular, an electronic device or the like) by electric leak after contact with neighboring instruments or wirings.

[Battery Outer Casing]

As for the battery outer casing 29, in addition to using a known metallic can casing, an envelope-shaped casing capable of covering a power generating element 21, in which a laminate film including aluminum (aluminum laminate film) is used, can be used. As for the laminate film, for example, a laminate film with a three-layer structure formed by laminating PP, aluminum and nylon in order can be used, but not limited thereto. From the viewpoint of having high output and excellent cooling performance, and of being suitably usable for a battery for a large instrument such as EV or HEV, a laminate film is preferable. In addition, a group pressure to a power generating element applied from the outside can be adjusted easily, and the thickness of an electrolytic solution layer can be adjusted to a desired thickness. Therefore, an exterior body is more preferably an aluminate laminate.

[Cell Size]

Figure 4:
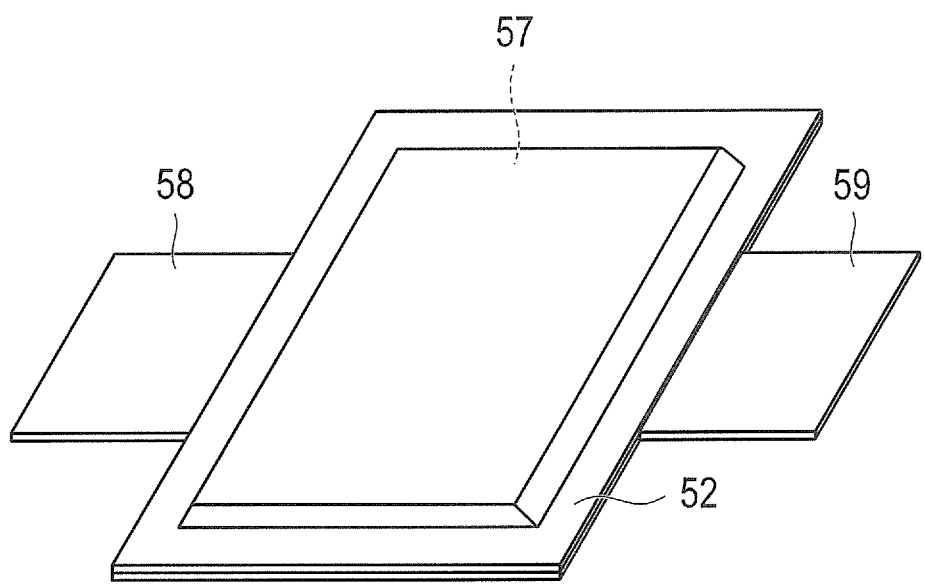
FIG. 4 is a perspective view of an appearance of a flat lithium ion secondary battery which is a typical embodiment of a secondary battery.

FIG. 4 is a perspective view illustrating an appearance of a flat lithium ion secondary battery which is a typical embodiment of a secondary battery.

As illustrated in FIG. 4, a flat lithium ion secondary battery 50 has a rectangular flat shape, and a positive electrode tab 58 and a negative electrode tab 59 are drawn from both sides thereof for taking out electric power. A power generating element 57 is surrounded by a battery exterior body 52 of the lithium ion secondary battery 50. A periphery thereof is thermally sealed. The power generating element 57 is sealed in a state where the positive electrode tab 58 and the negative electrode tab 59 are drawn to the outside. Here, the power generating element 57 corresponds to a power generating element 21 of a lithium ion secondary battery 10 illustrated in FIG. 1 described above. The power generating element 57 is laminated by a plurality of unit cell layers (unit cells) 19 formed of the positive electrode (positive electrode active material layer) 15, an electrolyte layer 17, and the negative electrode (negative electrode active material layer) 13.

The above lithium ion secondary battery is not limited to a laminated type flat-shaped battery. For example, a wound-type lithium ion secondary battery may have a cylindrical shape or a rectangular flat shape deformed by such a cylindrical shape, without any particular limitation. For example, in the above battery having a cylindrical shape, a laminate film or a conventional cylindrical can (metal can) may be used for an exterior body thereof, without any particular limitation. A power generating element is preferably packaged with an aluminum laminate film. This form can achieve reduction in weight.

In addition, drawing of the tabs 58 and 59 illustrated in FIG. 4 is not particularly limited. For example, the positive electrode tab 58 and the negative electrode tab 59 may be drawn from the same side, or each of the positive electrode tab 58 and the negative electrode tab 59 may be divided into a plurality of parts to be drawn from the sides, without being limited to that illustrated in FIG. 4. In the wound-type lithium ion secondary battery, for example, a terminal may be formed using a cylindrical can (metal can) in place of the tab.

In automotive applications or the like, recently, a large-sized battery has been demanded. In this embodiment, even when a battery structure covered by the power generating element 21 with an exterior body is increased in size, effects of the present embodiment can be exhibited effectively without impairing any effects thereof. Here, the large-size battery specifically has a rectangular negative electrode active material layer, and the length of the short side of the rectangle is preferably 100 mm or more. Such battery with large size can be used for an application in automobile. Herein, the short side length of a negative electrode active material layer indicates the length of the shortest side in each electrode. The upper limit of a length of a short side is, although not particularly limited, generally 250 mm or less.

It is also possible to determine the large size of a battery in view of a relationship between battery area or battery capacity, from the viewpoint of a large-size battery, which is different from a physical size of an electrode. For example, in the case of a flat and laminated type laminate battery, the ratio value of a battery area (projected area of a battery including an outer casing of the battery) to rated capacity is 5 $cm^2$/Ah or more, and the rated capacity is 3 Ah or more. In a battery satisfying such a requirement, a cell area per unit volume is large, and therefore a problem of reduction in cycle characteristics due to a distortion of an active material particle associated with charge-discharge cycles usually tends to become apparent. However, in this embodiment, an active material particle having a uniform shape is selected, and therefore such a problem can be solved. Therefore, the non-aqueous electrolyte secondary battery according to the present embodiment is preferable in terms of being able to exhibit the effect of the present embodiment effectively also in the above-described large-sized battery. A rating capacity of a battery can be determined by a measurement method described below.

The rated capacity of a battery is obtained as described below.

<<Measurement of Rated Capacity>>

For measurement of rated capacity, a battery for test was injected with an electrolyte solution, allowed to stand for 10 hours or so, and subjected to initial charge. After that, the measurement was carried out according to the following steps of 1 to 5 at temperature of 25° C., in the voltage range of 3.0 V to 4.15 V.

Step 1: After reaching 4.15 V by constant current charge at 0.2 C, it was rested for 5 minutes.

Step 2: After Step 1, it was charged for 1.5 hours by constant voltage charge followed by resting for 5 minutes.

Step 3: After reaching 3.0 V by constant current discharge at 0.2 C, it was discharged for 2 hours by constant voltage discharge followed by resting for 10 seconds.

Step 4: After reaching 4.1 V by constant current charge at 0.2 C, it was charged for 2.5 hours by constant voltage charge followed by resting for 10 seconds.

Step 5: After reaching 3.0 V by constant current discharge at 0.2 C, it was discharged for 2 hours by constant voltage discharge followed by resting for 10 seconds.

Rated capacity: The discharge capacity (CCCV discharge capacity) from the constant current discharge to constant voltage discharge of Step 5 is used as rated capacity.

In addition, increase in size of a battery can be specified by a volume energy density, a single cell rated capacity, or the like. For example, in a general electric vehicle, market request is that a travel distance (range) per one charge is 100 km. Considering such a range, the single cell rated capacity is preferably 20 Wh or more, and the volume energy density of a battery is preferably 153 Wh/L or more. The volume energy density and the rated discharge capacity are measured by a conventionally known method. Moreover, an aspect ratio of a rectangular electrode is preferably 1 to 3, and more preferably 1 to 2. The aspect ratio of the electrode is defined as an aspect ratio of a rectangular positive electrode active material layer. The aspect ratio within such a range is preferable because gas generated during charging can be uniformly discharged in a surface direction. As a result, cycle characteristics (discharge capacity retention ratio) after long-term use can be improved.

[Assembled Battery]

An assembled battery is formed by connecting plural batteries. Specifically, at least two of them are used in series, in parallel, or in series and parallel. According to arrangement in series or parallel, it becomes possible to freely control the capacity and voltage.

It is also possible to form a detachable small-size assembled battery by connecting plural batteries in series or in parallel. Furthermore, by connecting again plural detachable small-size assembled batteries in series or parallel, an assembled battery having high capacity and high output, which is suitable for a power source for operating a vehicle requiring high volume energy density and high volume output density or an auxiliary power source, can be formed. The number of the connected batteries for fabricating an assembled battery or the number of the stacks of a small-size assembled battery for fabricating an assembled battery with high capacity can be determined depending on the capacity or output of a battery of a vehicle (electric vehicle) for which the battery is loaded.

[Vehicle]

In the non-aqueous electrolyte secondary battery of the present embodiment, lowering of battery performance can be suppressed, and the capacity retention ratio (cycle characteristics) of battery is excellent. Moreover, by using the negative electrode active material having a high capacity and a uniform shape and NMC active material together, the volume energy density can also be increased. For use in a vehicle such as an electric vehicle, a hybrid electric vehicle, a fuel cell electric vehicle, and a hybrid fuel cell electric vehicle, long service life is required as well as high capacity and large size compared to use for an electric and mobile electronic device. Thus, the non-aqueous electrolyte secondary battery of the present embodiment can be preferably used as a power source for a vehicle, for example, as a power source for operating a vehicle or as an auxiliary power source.

Specifically, the battery or an assembled battery formed by combining plural batteries can be mounted on a vehicle. According to the present invention, a battery with excellent long term reliability, output characteristics, and long service life can be formed, and thus, by mounting this battery, a plug-in hybrid electric vehicle with long EV driving distance and an electric vehicle with long driving distance per charge can be achieved. That is because, when the battery or an assembled battery formed by combining plural batteries is used for, for example, a vehicle such as hybrid car, fuel cell electric car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptable power source device.

EXAMPLES

Hereinafter, the present invention will be described in more detail by using Examples and Comparative Examples. However, the technical scope of the present invention is not limited only to the following Examples in any way.

Example 1

(1) Manufacture of Positive Electrode

93% by mass of lithium nickel manganese cobalt oxide as a positive electrode active material (average particle diameter 8 μm), 3% by mass of polyvinylidene fluoride (PVDF) as a binder, and 4% by mass of carbon black (average particle diameter 300 nm) as a conductive aid were prepared. The positive electrode active material, the conductive aid, the binder, and an appropriate amount of N-methyl-2-pyrrolidone (NMP) as a slurry viscosity adjusting solvent were mixed to manufacture a positive electrode active material slurry. The resulting positive electrode active material slurry was coated on an aluminum foil (length 220 mm, width 120 mm, thickness 20 μm) as a positive electrode current collector, and was dried. Thereafter, by performing a pressing treatment and a positive electrode having a positive electrode active material layer (length 220 mm, width 200 mm, thickness 80 μm) on both surfaces of the positive electrode current collector was manufactured. At this time, the weight per unit area of the positive electrode active material amount was 24 mg/cm$^2$, and the density thereof was 3 g/cm$^3$. The aspect ratio of the electrode defined as an aspect ratio of a rectangular positive electrode active material layer was 1.67. An NMC composite oxide represented by a composition formula: $LiNi_{0.5}Mn_{0.3}Co_{0.2}O_2$ was used for the lithium nickel manganese cobalt oxide of the positive electrode active material.

(2) Preparation of Non-Aqueous Electrolytic Solution (Liquid Electrolyte)

A solution in which 1.0 M $LiPF_6$ was dissolved in a mixed solvent of ethylene carbonate (EC) and dimethyl carbonate (DMC) (volume ratio 1:1) was manufactured. Methylene methanedisulfonate as a sulfonic acid-based compound (additive) was added to the solution in an amount corresponding to 2% by weight with respect to the weight of a non-aqueous electrolytic solution to prepare the non-aqueous electrolytic solution. The phrase "1.0 M $LiPF_6$" means that the concentration of a lithium salt ($LiPF_6$) in a mixture of the mixed solvent and the lithium salt is 1.0 M.

(3) Manufacture of negative electrode

As a negative electrode active material, a carbon-based active material prepared so as to have a tap density of 0.99 g/cc, the degree of compression of 0.29, and a Hausner ratio of 1.4by a pulverizing treatment and using natural graphite having an average particle diameter of 21.4μm was prepared. 96.5% by mass of the negative electrode active material, 1.5% by mass of an ammonium salt of carboxymethyl cellulose as a binder, and 2.0% by mass of a styrene-butadiene copolymer latex were dispersed in purified water to prepare negative electrode active material slurry. Here, as the natural graphite, a material having a tap density of 0.99 g/cc, the degree of compaction of 0.29, and a Hausner ratio of 1.4 as physical properties was used.

The negative electrode active material slurry was coated on a copper foil (length 225 mm, width 205 mm, thickness 10 μm) as a negative electrode current collector, was dried at 120° C. for three minutes, and then was compression-molded with a roller press machine to manufacture a negative electrode having a negative electrode active material layer (length 225 mm, width 205 mm, thickness 60 μm) on both surfaces of the negative electrode current collector. At this time, the weight per unit area of the negative electrode active material amount was 9 mg/cm$^2$, and the density thereof was 1.5 g/cm$^3$.

(5) Manufacture of Laminate Cell

By laminating the positive electrode and the negative electrode obtained above alternately (positive electrode: three layers, negative electrode: four layers) through a separator (polypropylene microporous film, length 230 mm, width 210 mm, thickness 25 μm), a laminated body was manufactured. Tabs (current collector plates) were welded to the positive and negative electrodes of the laminated body, and the resulting laminated body was stored in an exterior body made of an aluminum laminate film. Thereafter, since a predetermined amount of non-aqueous electrolytic solution was injected and sealing was performed, a laminate battery having a length of 275 mm, a width of 230 mm, and a thickness of 7 mm was manufactured.

Example 2

A laminate battery was manufactured in a similar manner to Example 1 except that the sulfonic acid-based compound (additive) was not used in "(2) Preparation of non-aqueous electrolytic solution (liquid electrolyte)" in Example 1 and "(3) Manufacture of negative electrode" was changed to the following.

(3) Manufacture of Negative Electrode

As a negative electrode active material, a carbon-based active material prepared so as to have a tap density of 0.99 g/cc, the degree of compression of 0.28, and a Hausner ratio of 1.40 by a pulverizing treatment and using natural graphite having an average particle diameter of 21.7 μm was prepared. 96.5% by mass of the negative electrode active material, 1.5% by mass of an ammonium salt of carboxymethyl cellulose as a binder, and 2.0% by mass of a styrene-butadiene copolymer latex were dispersed in purified water to prepare negative electrode active material slurry. Here, as the natural graphite, a material having a tap density of 0.99 g/cc, the degree of compaction of 0.28, and a Hausner ratio of 1.4 as physical properties was used.

Example 3

A laminate battery was manufactured in a similar manner to Example 1 except that "(3) Manufacture of negative electrode" in Example 1 was changed to the following.

(3) Manufacture of Negative Electrode

As a negative electrode active material, a carbon-based active material prepared so as to have a tap density of 0.97 g/cc, the degree of compression of 0.28, and a Hausner ratio of 1.38 by a pulverizing treatment and using natural graphite having an average particle diameter of 21.0 μm was prepared. 96.5% by mass of the negative electrode active material, 1.5% by mass of an ammonium salt of carboxymethyl cellulose as a binder, and 2.0% by mass of a styrene-butadiene copolymer latex were dispersed in purified water to prepare negative electrode active material slurry. Here, as the natural graphite, a material having a tap density of 0.97 g/cc, the degree of compaction of 0.28, and a Hausner ratio of 1.38 as physical properties was used.

Example 4

A laminate battery was manufactured in a similar manner to Example 1 except that "(3) Manufacture of negative electrode" in Example 1 was changed to the following.

(3) Manufacture of Negative Electrode

As a negative electrode active material, a carbon-based active material prepared so as to have a tap density of 0.96 g/cc, the degree of compression of 0.26, and a Hausner ratio of 1.40 by a pulverizing treatment and using natural graphite having an average particle diameter of 21.2 μm was prepared. 96.5% by mass of the negative electrode active material, 1.5% by mass of an ammonium salt of carboxymethyl cellulose as a binder, and 2.0% by mass of a styrene-butadiene copolymer latex were dispersed in purified water to prepare negative electrode active material slurry. Here, as the natural graphite, a material having a tap density of 0.96 g/cc, the degree of compaction of 0.26, and a Hausner ratio of 1.4 as physical properties was used.

Comparative Example 1

A laminate battery was manufactured in a similar manner to Example 1 except that "(3) Manufacture of negative electrode" in Example 1 was changed to the following.

(3) Manufacture of Negative Electrode

As a negative electrode active material, a carbon-based active material prepared so as to have a tap density of 0.94 g/cc, the degree of compression of 0.26, and a Hausner ratio of 1.37 by a pulverizing treatment and using natural graphite having an average particle diameter of 21.2 μm was prepared. 96.5% by mass of the negative electrode active material, 1.5% by mass of an ammonium salt of carboxymethyl cellulose as a binder, and 2.0% by mass of a styrene-butadiene copolymer latex were dispersed in purified water to prepare negative electrode active material slurry. Here, as the natural graphite, a material having a tap density of 0.94 g/cc, the degree of compaction of 0.26, and a Hausner ratio of 1.37 as physical properties was used.

Comparative Example 2

A laminate battery was manufactured in a similar manner to Example 1 except that the sulfonic acid-based compound (additive) was not used in "(2) Preparation of non-aqueous electrolytic solution (liquid electrolyte)" in Example 1 and "(3) Manufacture of negative electrode" was changed to the following.

(3) Manufacture of Negative Electrode

As a negative electrode active material, a carbon-based active material prepared so as to have a tap density of 0.94 g/cc, the degree of compression of 0.25, and a Hausner ratio of 1.37 by a pulverizing treatment and using natural graphite having an average particle diameter of 21.2 μm was prepared. 96.5% by mass of the negative electrode active material, 1.5% by mass of an ammonium salt of carboxymethyl cellulose as a binder, and 2.0% by mass of a styrene-butadiene copolymer latex were dispersed in purified water to prepare negative electrode active material slurry. Here, as the natural graphite, a material having a tap density of 0.94 g/cc, the degree of compaction of 0.26, and a Hausner ratio of 1.37 as physical properties was used.

The tap density, the degree of compression, and the Hausner ratio of natural graphite (carbon-based active material) as the negative electrode active material used in Examples and Comparative Examples above were measured by the following method.

(Tap Density)

The tap density was measured according to JIS Z 2512: 2012. Specifically, the tap density was measured as a powder packing density after a predetermined amount of sample powder (negative electrode active material) was put into a 10 mL glass graduated cylinder, and was tapped 200 times.

(Degree of Compression)

The degree of compression was calculated by "the degree of compression=(tap density−bulk density)/tap density" by using a volume before measurement of the tap density, that is, in a state in which a predetermined amount of sample powder (negative electrode active material) was put into a glass graduated cylinder before being tapped as "bulk density".

(Hausner Ratio)

Calculation was performed by "Hausner ratio=tap density/bulk density". The tap density and the bulk density determined by the above measurement method were used.

[Evaluation Method; Life Characteristics Test]

After the laminate batteries manufactured in Examples 1 to 4 and Comparative Examples 1 and 2 were allowed to stand for a sufficient aging period (after an open circuit voltage was stabilized), the batteries were charged at 25° C. at 2C rate to 4.15 V, and an initial charge capacity was obtained. Thereafter, the batteries were rested for one hour, were discharged at 2C rate to 3.0 V, and the capacity at this time was used as an initial discharge capacity. By assuming such a charge-discharge operation to be one cycle, 600 cycles of charging and discharging were performed at 2C rate at 3.0 to 4.15 V, and an initial discharge capacity (at the first cycle) and a discharge capacity at the 600th cycle were measured. A (discharge) capacity retention ratio (%) was calculated by the following formula, and was evaluated as life characteristics (cycle durability).

Capacity retention ratio (%)=(discharge capacity at 600th cycle/initial discharge capacity)×100  [Mathematical Formula 1]

Results of the obtained capacity retention ratio (%) are shown in Table 4. The tap density, the degree of compression, and the Hausner ratio of each of the negative electrode active materials used in Examples and Comparative Examples are also shown in Table 4.

TABLE 4

|  | Comparative Example 1 | Comparative Example 2 | Example 1 | Example 2 | Example 3 | Example 4 |
|---|---|---|---|---|---|---|
| S-based additive | ○ | X | ○ | X | ○ | ○ |
| Tap [g/cc] | 0.94 | 0.94 | 0.99 | 0.99 | 0.97 | 0.96 |
| Degree of compression | 0.26 | 0.25 | 0.29 | 0.28 | 0.28 | 0.26 |
| Hausner ratio | 1.37 | 1.37 | 1.4 | 1.4 | 1.38 | 1.4 |
| Capacity retention ratio [%] | 77 | 75 | 84 | 80 | 83 | 83 |

In Table 4, the term "S-based additive" means a sulfonic acid-based compound used as an additive during preparation of the above non-aqueous electrolytic solution. The mark ○ means "added", and the mark x means "not added".

From the results in Table 4 above, a larger effect for improving the capacity retention ratio of a battery is observed in the present Examples 1 to 4 than in Comparative Examples 1 and 2. As described above, this indicates that by using a negative electrode active material having a tap density, and furthermore the degree of compression and a Hausner ratio in a specific range, a surface (particle shape) of the negative electrode active material is controlled so as to be uniform. It is seen that the negative electrode active material having a surface (particle shape) controlled uniformly suppresses local deterioration due to charging and discharging during charging and discharging, resulting in improvement of the capacity retention ratio.

In addition, as for Examples 1 to 4, a larger effect for improving the capacity retention ratio of a battery is observed in Examples 1, 3 and 4 in which an additive is added during preparation of a non-aqueous electrolytic solution than in Example 2 in which no additive is added during preparation of a non-aqueous electrolytic solution. This indicates that a uniform and firm coating can be generated by a reaction between a surface of a negative electrode active material having a surface (particle shape) controlled uniformly and an additive. Thus, local deterioration due to charging and discharging can be prevented during charging and discharging more effectively in Examples 1, 3 and 4 than in Example 2 not having a uniform and firm coating, resulting in improvement of the capacity retention ratio.

Furthermore, as for Examples 1, 3 and 4, a slightly larger effect for improving the capacity retention ratio of a battery is observed in Example 1 than in Examples 3 and 4. This indicates that Example 1 satisfies all of a preferable range of 0.99 g/cc or more (the highest value) of the tap density, a preferable range of 0.275 or more (the highest value 0.29) of the degree of compression, and a preferable range of 1.38 or more (the highest value 1.4) of the Hausner ratio, and the most ideal particle surface of a negative electrode active material and a uniform and firm coating are thereby formed, resulting in further improvement of the capacity retention ratio.

| Reference Signs List | |
|---|---|
| 10, 50 | lithium ion secondary battery |
| 11 | negative electrode current collector |
| 12 | positive electrode current collector |
| 13 | negative electrode active material layer |
| 15 | positive electrode active material layer |
| 17 | electrolyte layer |
| 19 | unit cell layer |
| 21, 57 | power generating element |
| 25 | negative electrode current collecting plate |
| 27 | positive electrode current collecting plate |
| 29, 52 | battery exterior body |
| 31 | negative electrode active material particle of the present embodiment |
| 31' | existing negative electrode active material particle |
| 33 | protrusion of existing negative electrode active material particle |
| 41 | negative electrode active material particle having no uniformity in shape or size as the whole of particles |
| 41a | (negative electrode active material) particle having an irregular shape |
| 41b | another (negative electrode active material) particle |
| 42 | negative electrode active material particle having a uniform shape as the whole of particles but still having a distortion as a single particle |
| 42a | protrusion of a negative electrode active material particle still having a distortion |
| 43 | negative electrode active material particle having uniformity as the whole of particles and as a single particle |
| 58 | positive electrode current collecting plate (positive electrode tab) |
| 59 | negative electrode current collecting plate (negative electrode tab) |

The invention claimed is:

1. A non-aqueous electrolyte secondary battery comprising a negative electrode containing a carbon-based negative electrode active material, an electrolyte layer, and a positive electrode containing a positive electrode active material, wherein a tap density of the negative electrode active material is between 0.99 g/cc and 1.10 g/cc, inclusive, and a Hausner ratio thereof is between 1.38 and 1.6, inclusive, an electrolyte forming the electrolyte layer comprises a liquid electrolyte or gel polymer electrolytic solution containing a sulfonic acid-based compound in its composition, wherein the sulfonic acid-based compound has a concentration of 0.5 to 3.5% by mass of the electrolyte and comprises a disulfonate compound, a ratio of a cell area (projected area of a battery including a battery exterior body) with respect to a rated capacity is 5 cm$^2$/Ah or more, and the rated capacity is 3 Ah or more, and at least one member of the positive electrode active materials is a lithium composite oxide represented by general formula:

$$Li_aNi_bMn_cCo_dM_xO_2,$$

wherein a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$, and M is at least one member selected from the group consisting of Ti, Zr, Nb, W, P, Al Mg, V, Ca, Sr and Cr.

* * * * *